(12) United States Patent
Parietti et al.

(10) Patent No.: US 9,845,167 B1
(45) Date of Patent: Dec. 19, 2017

(54) DISPENSING SYSTEM

(71) Applicant: Multiply Labs Inc., San Francisco, CA (US)

(72) Inventors: Federico Parietti, San Francisco, CA (US); Kameron C. Chan, San Francisco, CA (US); Lawrence Zachary Bright, San Francisco, CA (US); Jeffrey Ackerman Cuhran, Warwick, RI (US); Alice Melocchi, Dalmine (IT)

(73) Assignee: MULTIPLY LABS INC., San Francisco, CA (US)

( * ) Notice: Subject to any disclaimer, the term of this patent is extended or adjusted under 35 U.S.C. 154(b) by 0 days.

(21) Appl. No.: 15/625,916

(22) Filed: Jun. 16, 2017

Related U.S. Application Data

(60) Provisional application No. 62/382,450, filed on Sep. 1, 2016.

(51) Int. Cl.
*B65B 1/30* (2006.01)
*B65B 1/12* (2006.01)
*B65B 57/14* (2006.01)
*B67D 99/00* (2010.01)

(52) U.S. Cl.
CPC ............... *B65B 1/30* (2013.01); *B65B 1/12* (2013.01); *B65B 57/145* (2013.01); *B67D 99/00* (2013.01)

(58) Field of Classification Search
CPC ................................. B65B 1/30; B65B 1/12; B65B 57/145; B65B 39/00; B67D 99/00; G01F 11/24; G01F 11/18; G01F 11/14; F16L 29/00; F16K 27/0218; B01F 15/0237; B01F 15/02

USPC ....... 141/100, 107, 113, 114, 137, 231, 284, 141/307, 318, 319, 320, 322, 339, 340, 141/346, 363, 380, 383
See application file for complete search history.

(56) References Cited

U.S. PATENT DOCUMENTS

| 1,902,272 | A | * | 3/1933 | Willmann | ............... | A61J 3/078 |
| | | | | | | 141/83 |
| 2,098,905 | A | * | 11/1937 | Donaghy, Sr. | ............ | B65B 1/12 |
| | | | | | | 141/161 |
| 5,038,839 | A | * | 8/1991 | Morimoto | .......... | G01G 13/2943 |
| | | | | | | 141/103 |

(Continued)

*Primary Examiner* — Timothy L Maust
*Assistant Examiner* — Andrew Schmid
(74) *Attorney, Agent, or Firm* — Morgan, Lewis & Bockius LLP

(57) ABSTRACT

A dispensing system comprises a main base with a hopper insertion hole. An upper base, fixed above the main base by spacers, comprises a stirrer insertion hole. A lower base, below the main base, has a hopper insertion hole with an aperture larger than a diameter of a hopper, and is coupled to the main base by a guide. A rotatable hopper, disposed in the insertion hole of the main base, comprises a bottom surface with metering holes. A stirrer, inside the hopper and fixed to the upper base, feeds material into the metering holes. A gate, on a bottom surface of the lower base, comprises a bottom surface with a dispensing hole. The gate diameter is greater than the hopper. A gate spring, between the bottom of the main base and an upper surface of the lower base, is mounted parallel to a sliding motion of the lower base. A vibration device agitates the assembly on the main base.

27 Claims, 27 Drawing Sheets

(56) References Cited

U.S. PATENT DOCUMENTS

| | | | | |
|---|---|---|---|---|
| 5,431,201 A * | 7/1995 | Torchia | A61J 1/20 141/100 |
| 6,340,036 B1 * | 1/2002 | Toyoizumi | B65B 1/12 141/275 |
| 6,484,764 B1 * | 11/2002 | Wegman | B65B 1/12 141/256 |
| 7,191,807 B2 * | 3/2007 | DeMaison | G03G 15/0894 141/302 |
| 7,913,720 B2 * | 3/2011 | Tribble | B65B 3/003 141/104 |
| 8,875,749 B2 * | 11/2014 | Nufer | G01G 13/003 141/1 |
| 2001/0027823 A1 * | 10/2001 | Luchinger | G01G 13/024 141/83 |
| 2003/0041916 A1 * | 3/2003 | Kohashi | B65B 1/32 141/83 |
| 2004/0007285 A1 * | 1/2004 | Finke | B65D 88/32 141/83 |
| 2007/0131707 A1 * | 6/2007 | Poole | B65B 1/12 222/14 |
| 2007/0251596 A1 * | 11/2007 | Scherzer | B01F 3/18 141/2 |
| 2008/0115462 A1 * | 5/2008 | Doyle | B65B 3/08 53/459 |
| 2009/0020563 A1 * | 1/2009 | Morimoto | B65B 1/12 141/18 |
| 2009/0078334 A1 * | 3/2009 | Nufer | B65B 1/36 141/83 |
| 2009/0140003 A1 * | 6/2009 | Fontaine | B65B 1/12 222/1 |
| 2011/0173933 A1 * | 7/2011 | Maheshwari | B65B 1/46 53/473 |
| 2011/0204088 A1 * | 8/2011 | Luchinger | G01F 11/00 141/83 |
| 2012/0298253 A1 * | 11/2012 | Maas | B65B 1/12 141/5 |
| 2014/0238536 A1 * | 8/2014 | Kumakura | B65B 37/10 141/67 |

* cited by examiner

DISPENSING SYSTEM

CROSS-REFERENCE(S) TO RELATED APPLICATION

This application claims priority to U.S. Provisional Patent Application No. 62/382,450 entitled "PRECISION DISPENSING SYSTEM FOR DRY MATERIAL IN POWDER FORM," filed on Sep. 1, 2016, the entire contents of which is incorporated herein for all purposes by this reference.

TECHNICAL FIELD

The present disclosure relates generally to a dispensing system, and more particularly, to a dispensing system comprising a dispenser, a plate, and a dispensing station.

BACKGROUND

In general, a dispenser is configured to accurately and precisely dispense target doses of materials such as solids, liquids, and powders. The dispensing of powders using conventional dispensers incurs unique challenges because the bulk density of the material varies. This creates non-uniform flow which requires agitation, and the powder can often be lodged between moving parts in the dispenser due to the fine grain size of the material. Another challenge with dispensers is that the agitation necessary in such dispensers is typically provided by a vibration motor. This has the drawback that micro-impacts and galling occurs between moving parts which cause an increase in dispenser maintenance and costs.

Dispensing material contamination is also a concern for conventional dispensers. One source of such contamination arises from the actuators in conventional dispensers. In such dispensers, these actuators are disposed above the dispensing material, are in close proximity to the dispensing material, and require lubrication. A leak in such lubrication creates a high risk of contamination.

Another drawback with conventional dispensers is that they require a large number of actuators when more than one material is dispensed. This renders the conventional dispenser susceptible to frequent maintenance.

Still another drawback with conventional dispensers is that cleaning them is disadvantageous because they are typically difficult to dismantle and reassemble. Despite this, thorough cleaning is necessary when a variety of dispensing materials are used in order to avoid cross contamination. Thus, in conventional processes using conventional dispensers, it is necessary to laboriously disassemble and reassemble the dispensers for cleaning purposes.

Due to the above drawbacks, the performance and efficiency of conventional dispenser systems is unsatisfactory at best, decreases over time, and requires excessive maintenance and cleaning. This reduces overall manufacturing time, thereby increasing the costs of production.

Given the above background, improved dispensers are needed in the art.

The information disclosed in this Background section is only for enhancement of understanding of the general background of the invention and should not be taken as an acknowledgement or any form of suggestion that this information forms the prior art already known to a person skilled in the art.

SUMMARY

The dispensers detailed in the present disclosure address the shortcomings in the prior art detailed above.

Various aspects of the present disclosure are directed to providing a dispensing system, which is configured to accurately and precisely dispense a target dose of material with minimal actuators, no moving parts in contact with the dispensed material, and designed for simplicity, less maintenance, failure modes, and contamination, as well as easier cleaning.

In accordance with an aspect of the present disclosure, the above and other objects can be accomplished by the provision of a dispensing system including: a dispenser, a fixing plate, a dispensing station, and a dial.

In some embodiments, the dispenser comprises a vibrating assembly that includes a hopper including one or more metering holes on a bottom surface thereof. The dispenser further comprises an upper base with a second insertion hole for receiving the stirrer and a stirrer disposed inside the hopper and fixed to the upper base. The dispenser further comprises a primary base with a plurality of spacers, a plurality of spring-dampers, a vibration device, a first insertion hole for receiving the hopper and a hopper hub, a pair of linear guides, and a first end of a gate spring. The dispenser further comprises a lower base in which a transfer block, gate, a second end of the gate spring, and gate hub are disposed.

The fixing plate is isolated from the vibrating assembly using the plurality of spring-dampers, and is configured to fix the dispenser to the dispensing station or the dial.

In some embodiments, the dispensing station comprises a stationary base, an upper base, a platform, a drive wheel to rotate the hopper, a first actuator configured to orient the upper base and a desired dispenser, a second actuator configured to engage the drive wheel with the hopper, a third actuator configured to rotate the drive wheel, and a fourth actuator configured to engage a transfer block of the dispenser.

In some embodiments, the dispensing system comprises a containment system and a support structure configured to contain a dispensed material and determine the weight of a dispensed material from the dispenser apparatus. The containment system comprise a primary base formed with a plurality of holes thereby allowing a plurality of prongs of the support structure to penetrate through. A bin is disposed on a top surface of the primary base and configured to accommodate a screen which filters material. A first fan is disposed below the bin and configured to draw air through the screen. A printing plate is disposed above the bin and formed in a 'T'-shape, configured to be a target dispensing location. The support structure comprises a balance, which determines the mass of the dispensed material, and the plurality of prongs.

The dispensing system according to an exemplary embodiment of the present disclosure is provided to cure the drawbacks of the prior art while having the advantage of minimal moving parts and actuators to reduce maintenance and cleaning. In such embodiments, the actuators are distanced from the dispenser to prevent contamination. Further, a modular dispenser is provided that includes a plurality of dispensers that advantageously can be employed to dispense multiple materials.

The methods and apparatuses of the present disclosure have other features and advantages which will be apparent from or are set forth in more detail in the accompanying drawings, which are incorporated herein, and the following Detailed Description, which together serve to explain certain principles of the present invention.

Figure 1:
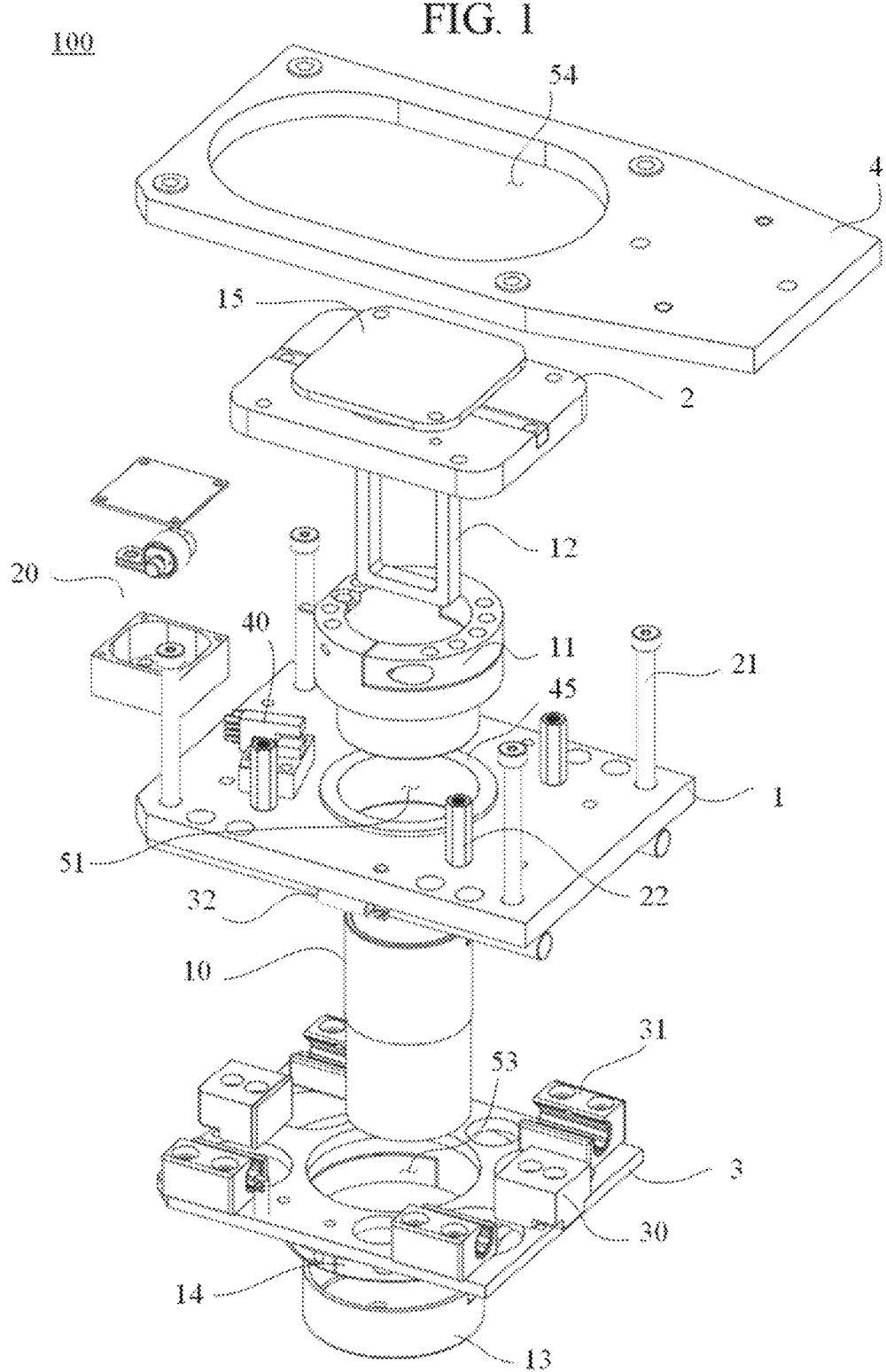
FIG. 1 is an exploded view of the dispenser and fixing plate according to an exemplary embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawing and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the present invention as defined by the appended claims.

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject. Furthermore, the terms "subject" and "user" are used interchangeably herein.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and or "comprising," when used in this specification, specify the presence of stated features, integers, steps, operations, elements, and or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

An aspect of the present disclosure is directed to a dispensing system comprising a dispenser 100, a fixing plate 4, a dispensing station 200, and a dial 250. Referring to FIG. 1 to FIG. 7, the dispenser 100, according to an exemplary embodiment of the present disclosure, includes a base 1 formed with a first insertion hole 51 that receives the hopper 10. A vibration device 20 is disposed on a surface of the base 1 and is configured to vibrate the dispenser 100. A plurality of spacers 22 are disposed between an upper base 2 and the base 1. A gate spring 32 is disposed on a bottom surface of the base 1.

The dispenser 100 also includes an upper base 2 formed with a second insertion hole 52 (FIG. 4) that receives the stirrer 12. The stirrer 12 is fixed to the upper base 2. The stirrer 12 feeds the dispensing material inside the hopper 10 into a plurality (e.g., two or more three or more, ten or more) of metering holes 60. In the present embodiment, the stirrer 12 is formed as a bar shape, however the present disclosure is not limited thereto. For instance, the stirrer 12 could have a chamfer shape to assist the supplying of dispensing material. In some embodiments, the stirrer 12 is formed in an auger or plate shape, and in another embodiment the stirrer 12 is formed as a bent tube.

The dispenser 100 also includes a lower base 3 formed with a third insertion hole 53 that accommodates a gate 13. A second end of the gate spring 32 is disposed on an upper surface of the lower base 3. A pair of linear guides 31 couple the lower base 3 to the base 1.

In some embodiments, the dispenser 100 further includes a hopper hub 11, a gate hub 14, a lid 15, a plurality of spring-dampers 21, a transfer block 30, a detector 40, and a bearing 45 as further described below.

The base 1 has a plate shape and is formed with the first insertion hole 51 at the center thereof. As described above, the first insertion hole 51 into or from which the hopper 10 can be inserted or withdrawn, is formed through the broad surface of the base 1. The vibration device 20 is disposed on the upper surface of the base 1, but is not limited thereto. For instance, the vibration device 20 may be disposed on the bottom surface of the base 1. The size and actuation pattern of the vibration device 20 can be varied to create a desired vibration frequency and amplitude according to a design by one skilled in the art.

The upper base 2 has a similar plate shape as the base 1, and is formed with the second insertion hole 52 at the center thereof. As described above, the second insertion hole 52, into which the stirrer 12 can be inserted and fixed, is formed through the broad surface of the upper base 2. In some embodiments, a recessed groove is formed on the upper surface of the upper base 2 from which the stirrer 12 is accommodated. The stirrer 12 is inserted through the second insertion hole 52 and is received by the hopper 10.

The illustrated embodiment is configured with the lid 15 disposed on the upper surface of the upper base 2. This isolates the contents of the hopper 10 from an external environment. In the illustrated embodiment, the lid 15 is formed from a transparent material so that the contents of the hopper 10 may be examined during operation. However, the present disclosure is not limited thereto. For instance, in some embodiments the lid 15 is formed of a different material such as metal or plastic, or is entirely omitted. Also, in the illustrated embodiment, the lid 15 is coupled to the upper surface using screws, however the lid 15 is coupled using magnets, a hinge, or a similar mechanism in other embodiments.

The spacers 22 are disposed on the bottom surface of the upper base 2 and the upper surface of the base 1. A gap is formed between the hopper 10 and the stirrer 12. The height of the spacers 22 determines the height of the gap between the hopper 10 and the stirrer 12. The height of the gap is configured so that the clearance is sufficiently large to prevent galling and sufficiently small to prevent the dispensing material from entering the gap. In some embodiments, the height of the gap ranges from 0 mm to 3 mm. In the illustrated embodiment, the spacers 22 are configured as standoffs, however the present disclosure is not limited thereto.

The lower base 3 has a similar plate shape as the base 1 and is formed with the third insertion hole 53 at the center thereof. As described above, the third insertion hole 53 into or from which the hopper 10 can be inserted or withdrawn, is formed through the broad surface of the lower base 3. The aperture of the third insertion hole 53 is larger than a diameter of the hopper 10 so that the lower base 3 is slideable about the hopper 10. In some embodiments, the aperture of the third insertion hole 53 ranges from 15 mm to 230 mm. The gate 13 is disposed on the bottom surface of the lower base 3 and is mounted to the lower base 3 using the gate hub 14. The gate 13 is disposed such that there is a gap formed between the hopper 10 and the gate 13. In some embodiments, the gap between the hopper 10 and the gate 13 ranges from 0 mm to 3 mm. In some embodiments, the hopper 10 has a diameter which ranges from 10 mm to 200 mm. The height of the hopper 10 determines the amount of the gap between the hopper 10 and the gate 13. The amount of the gap (e.g., height, width, etc.) is configured so that the clearance is sufficiently large to prevent galling and sufficiently small to prevent the dispensing material from entering the gap.

The lower base 3 also comprises a second end of a gate spring 32 disposed on the upper surface of the lower base 3. The first end of the gate spring 32 is disposed on the bottom surface of the base 1. The gate spring 32 provides a restoring force in parallel with the sliding motion of the lower base 3.

The lower base 3 is coupled to the base 1 using a pair of linear guides 31. The linear guides 31 are configured to restrict the motion of the lower base 3 when switching between ON and OFF states.

Figure 5:
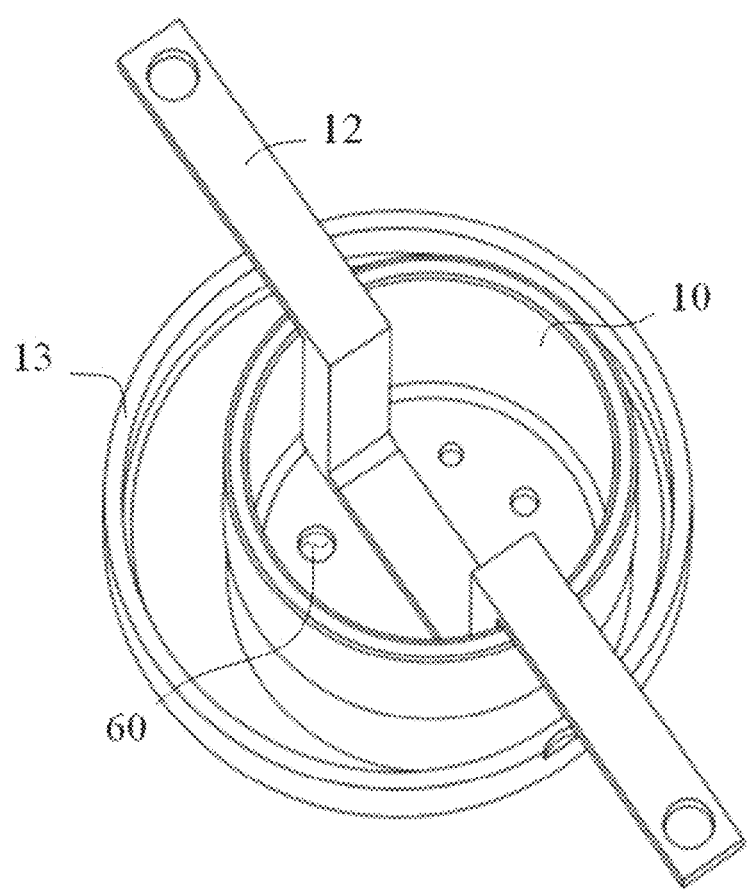
FIG. 5 is a view of the hopper, gate, metering holes, and stirrer according to an exemplary embodiment of the present disclosure.

Referring to FIG. 5, the hopper 10 is formed with one or more metering holes 60 on the bottom surface thereof. The volume defined by the one of more metering holes 60 defines a predetermined volume of material to be dispensed. In the present embodiment, an array of metering holes 60 are disposed on the bottom surface of the hopper 10, but the present disclosure is not limited thereto. For instance, the metering holes 60 may only be a singular metering hole 60, or be formed in a variety of shapes such as a rectangular prism or a frustum of a right circular cone. As mentioned above, the hopper 10 is inserted through the first, second, and third insertion holes 51, 52, and 53, and is sandwiched between the gate 13 and the hopper hub 11.

Figure 3:
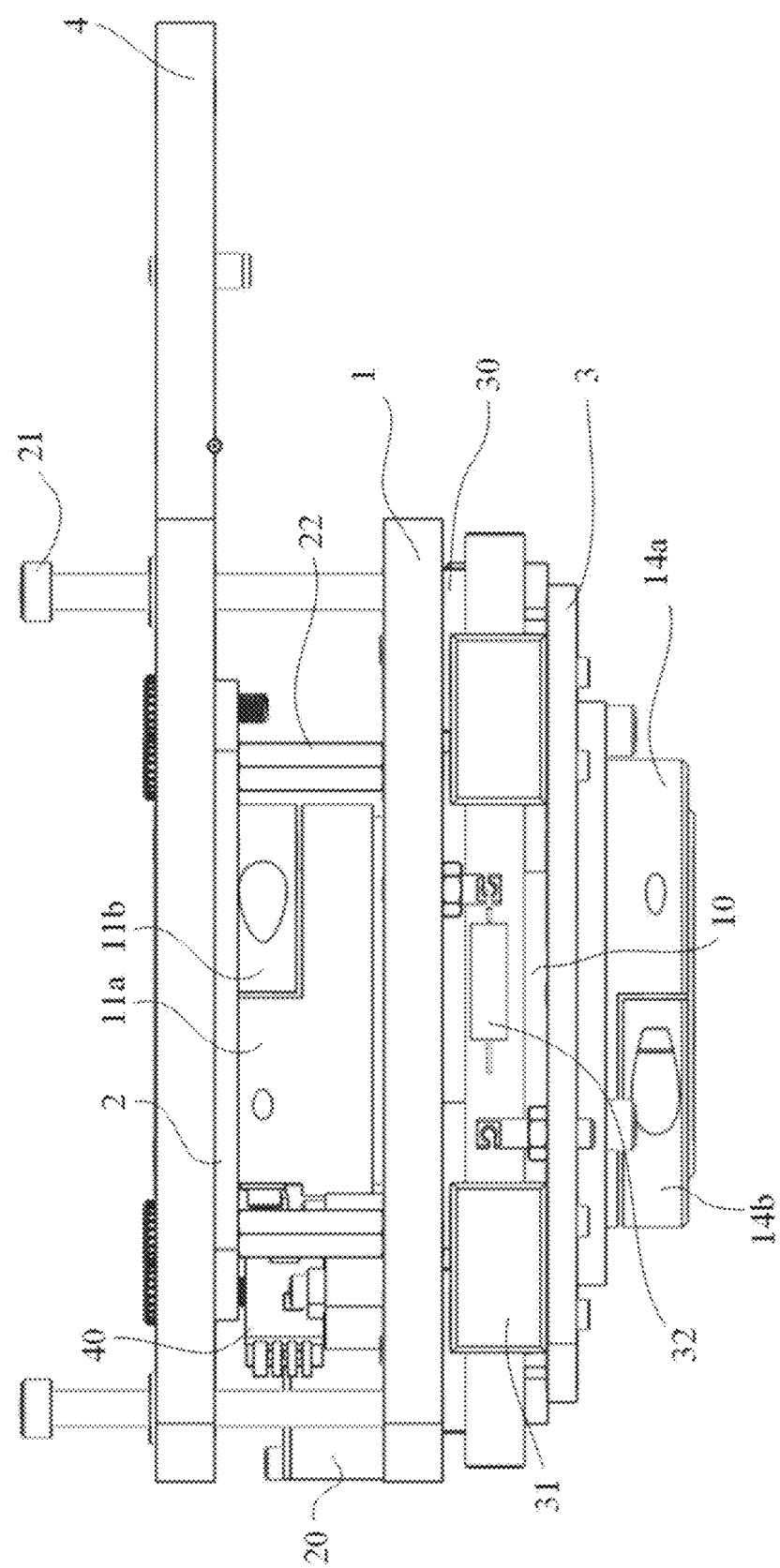
FIG. 3 is another view of the dispenser and fixing plate according to an exemplary embodiment of the present disclosure.
Figure 4:
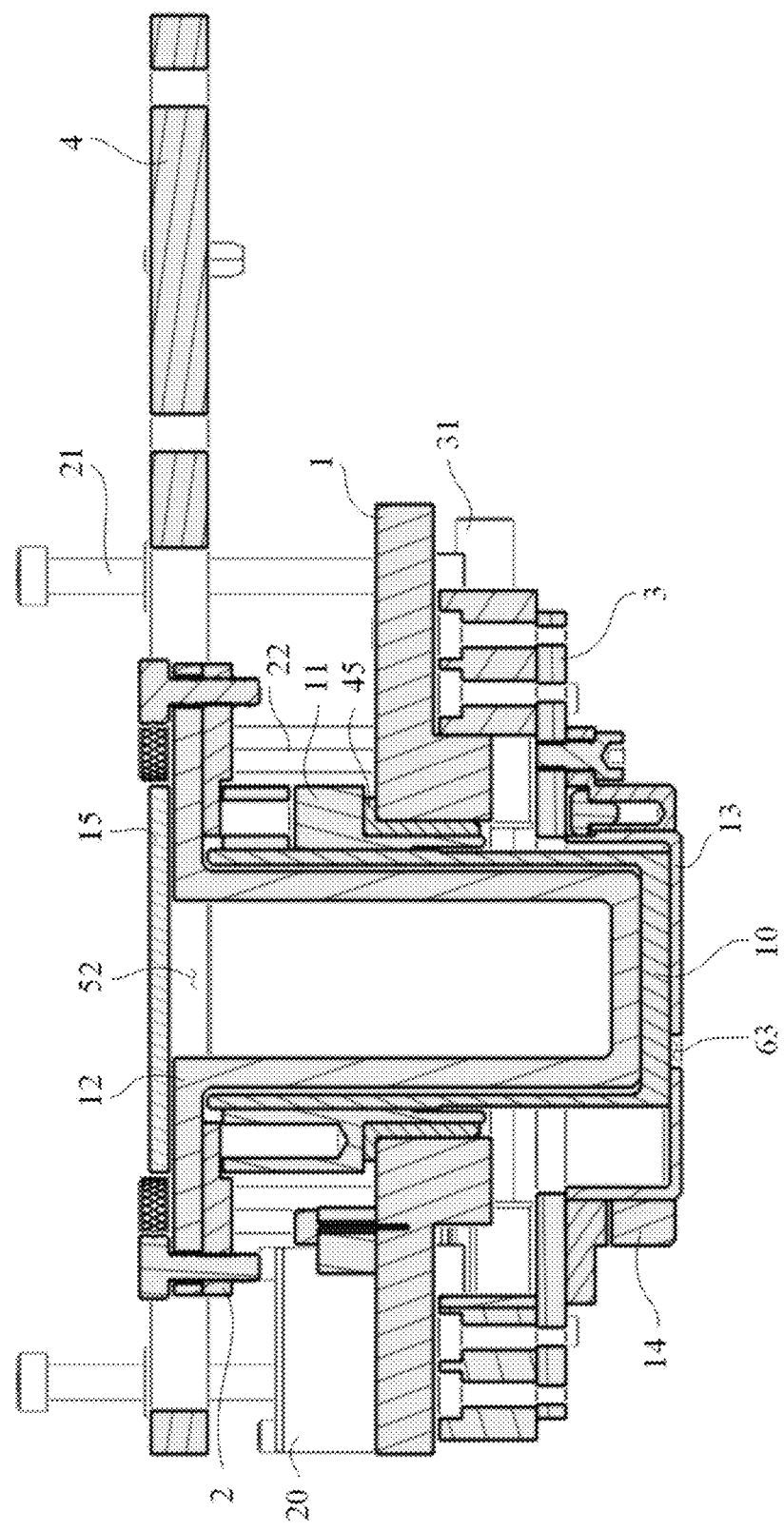
FIG. 4 is a sectional view of the dispenser and fixing plate according to an exemplary embodiment of the present disclosure from the view of FIG. 3.

The hopper hub 11 is disposed between the hopper 10 and the bearing 45, and is configured to fix an upper portion of the hopper 10 as well as transfer the energy of the drive wheel 230 to the hopper 10. As shown in FIG. 3, the hopper hub 11 is formed from two coupled hopper hub portions 11a and 11b, and has a shape in which the upper portion has a diameter larger than the first insertion hole 51, and the lower portion has a diameter slightly less than the first insertion hole 51. In some embodiments, the first insertion hole 51 has a diameter that ranges from 10 mm to 200 mm. In some embodiments, the hopper hub 11 sits on the first insertion hole 51. In some embodiments, the hopper hub portions 11a and 11b are separated to allow the hopper 10 to be withdrawn from the first insertion hole 51 for cleaning and maintenance.

The bearing 45 is disposed between the hopper hub 11 and the base 1, and is configured to reduce friction between the two members. In the present embodiment, the bearing 45 is disposed between the hopper hub 11 and the base 1, however the present disclosure is not limited thereto. For instance, in some embodiments, the bearing 45 is omitted and the hopper hub 11 and the base 1 are in close contact.

Figure 6:
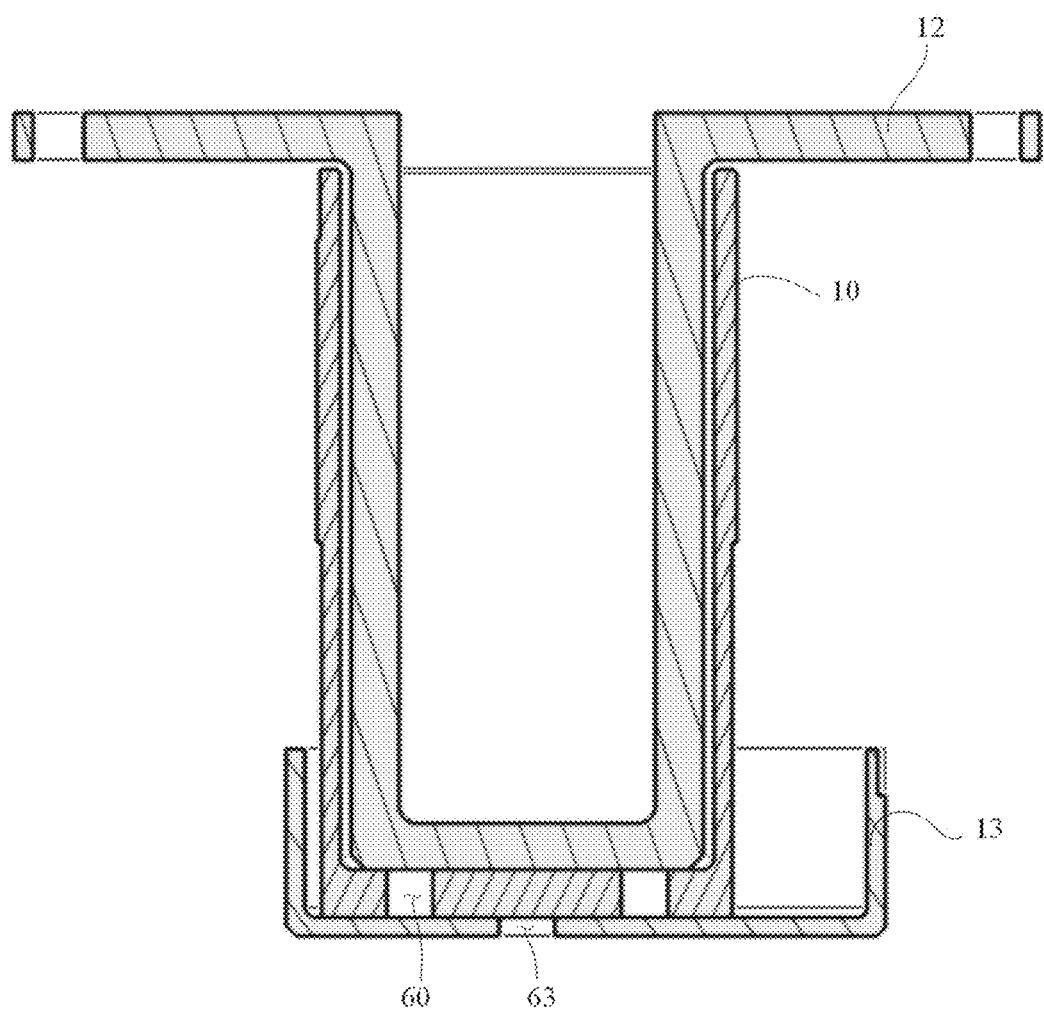
FIG. 6 is an illustration of the hopper, gate, and stirrer in the OFF position in accordance with an embodiment of the present disclosure.
Figure 7:
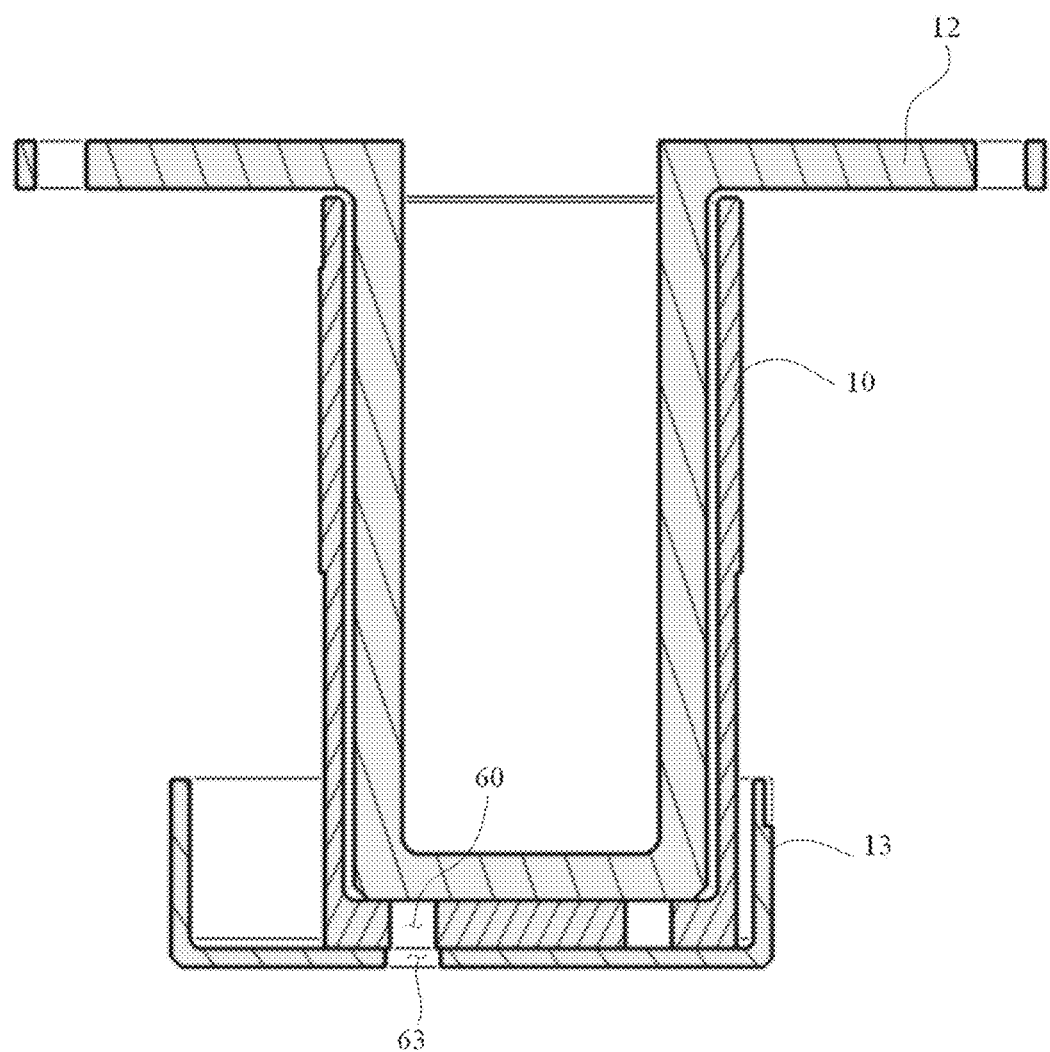
FIG. 7 is an illustration of the hopper, gate, and stirrer in the ON position in accordance with an embodiment of the present disclosure.
Figure 8:
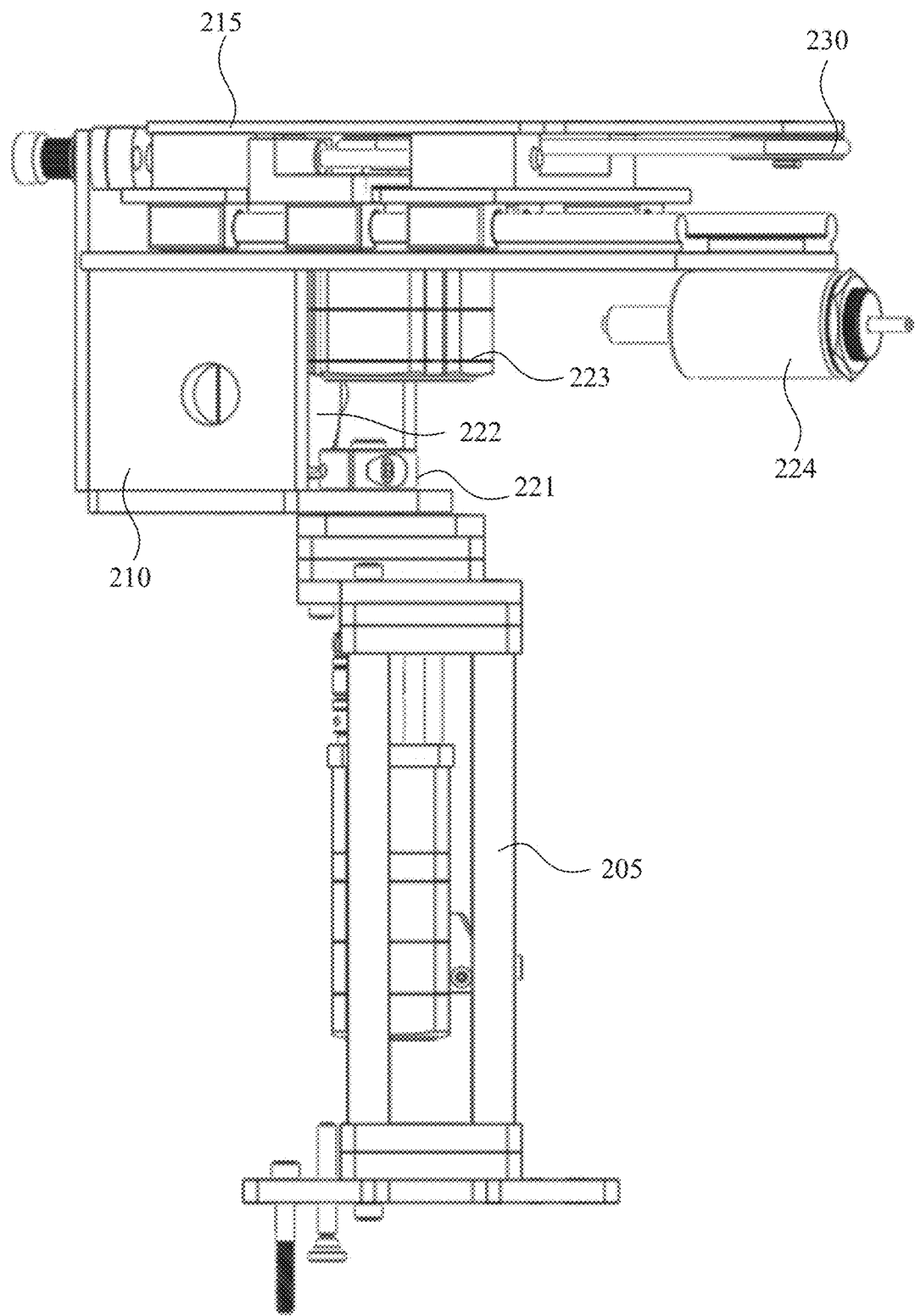
FIG. 8 is a view of the dispensing station according to an exemplary embodiment of the present disclosure.
Figure 9:
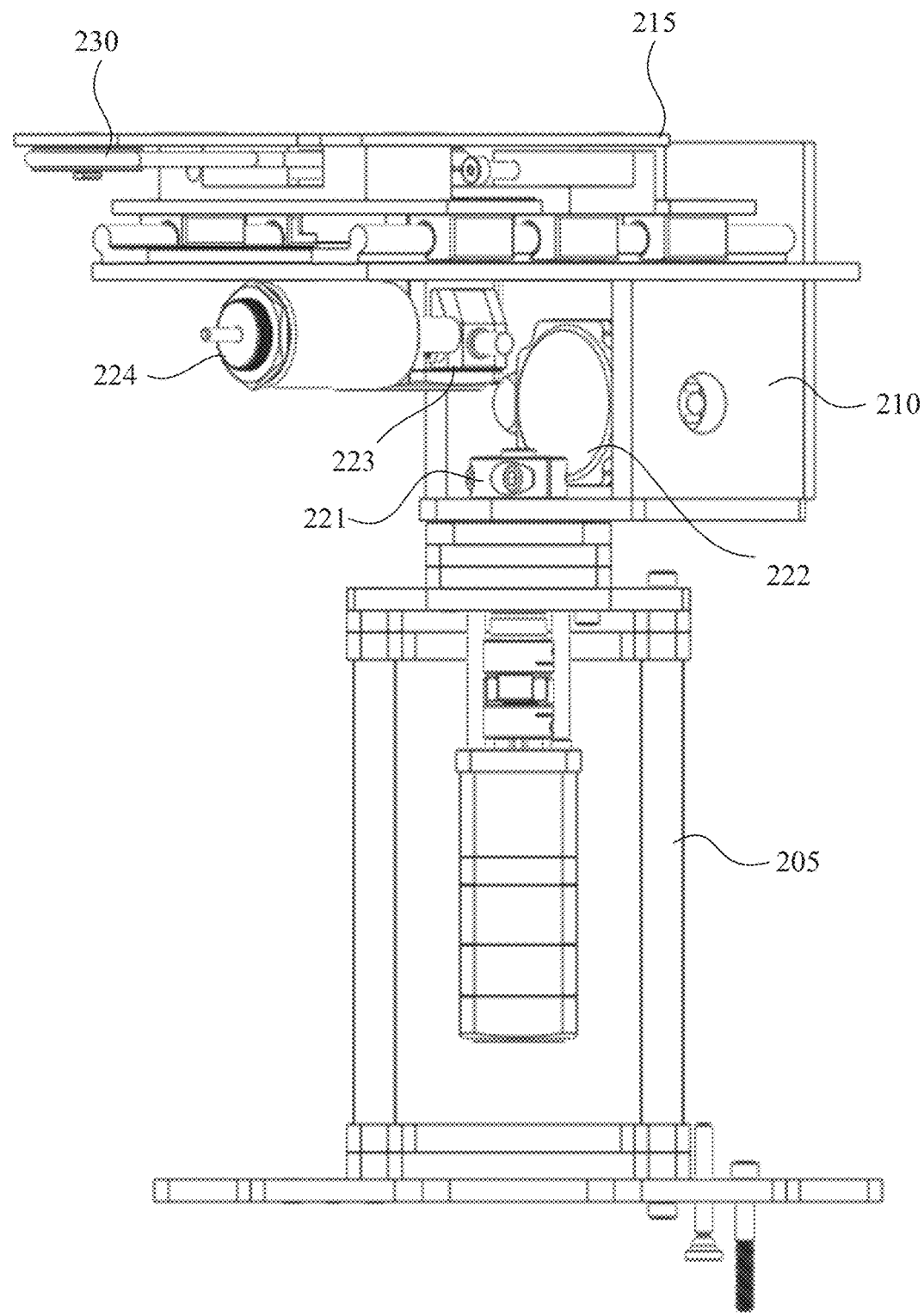
FIG. 9 is another view of the dispensing station according to an exemplary embodiment of the present disclosure.
Figure 10:
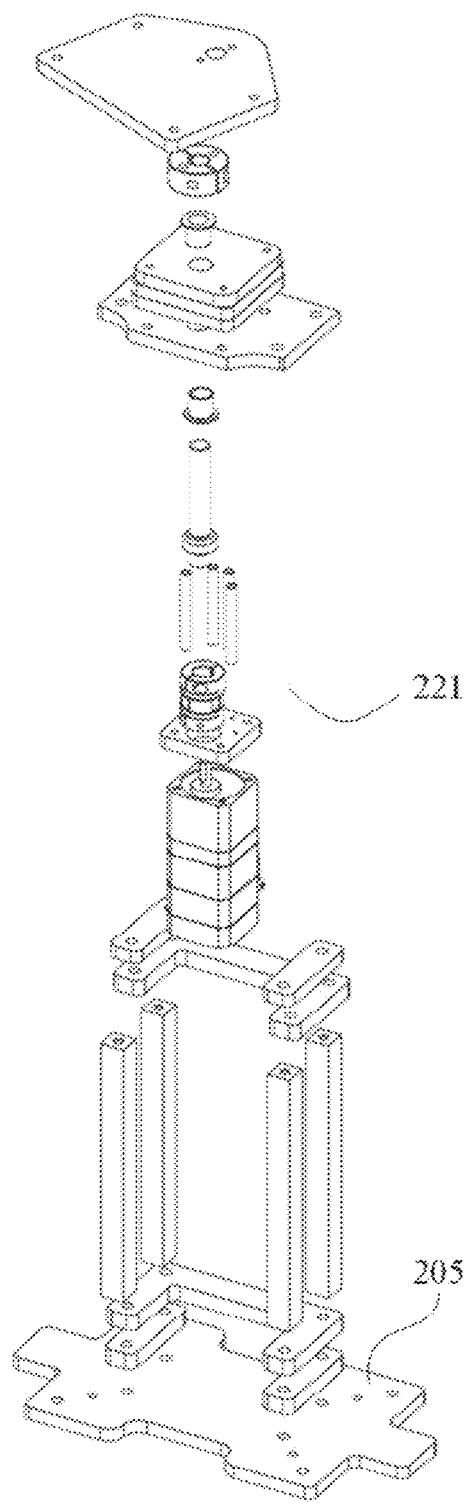
FIG. 10 is an exploded view of the stationary base of the dispensing station according to an exemplary embodiment of the present disclosure.
Figure 11:
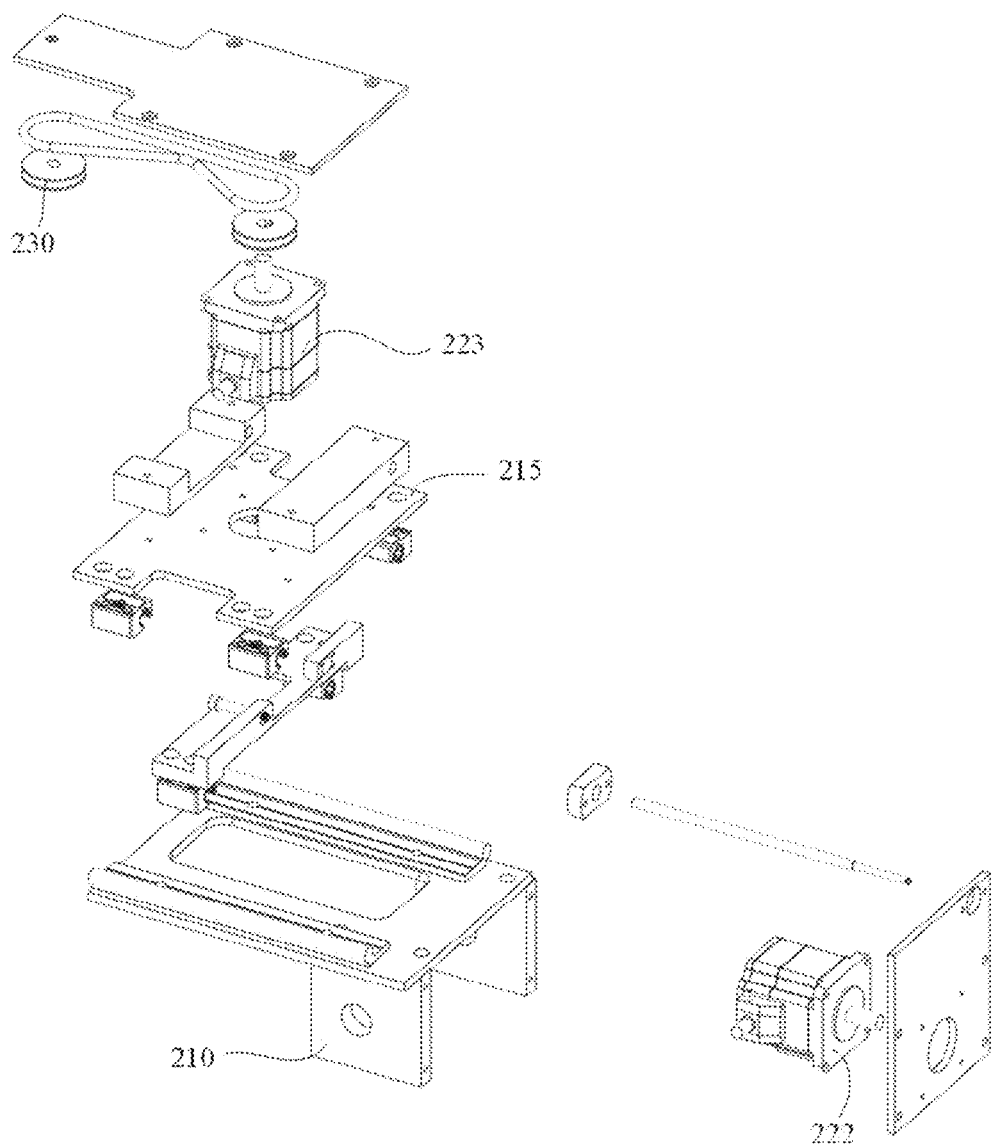
FIG. 11 is an exploded view of the platform and the upper base of the dispensing station according to an exemplary embodiment of the present disclosure.
Figure 12:
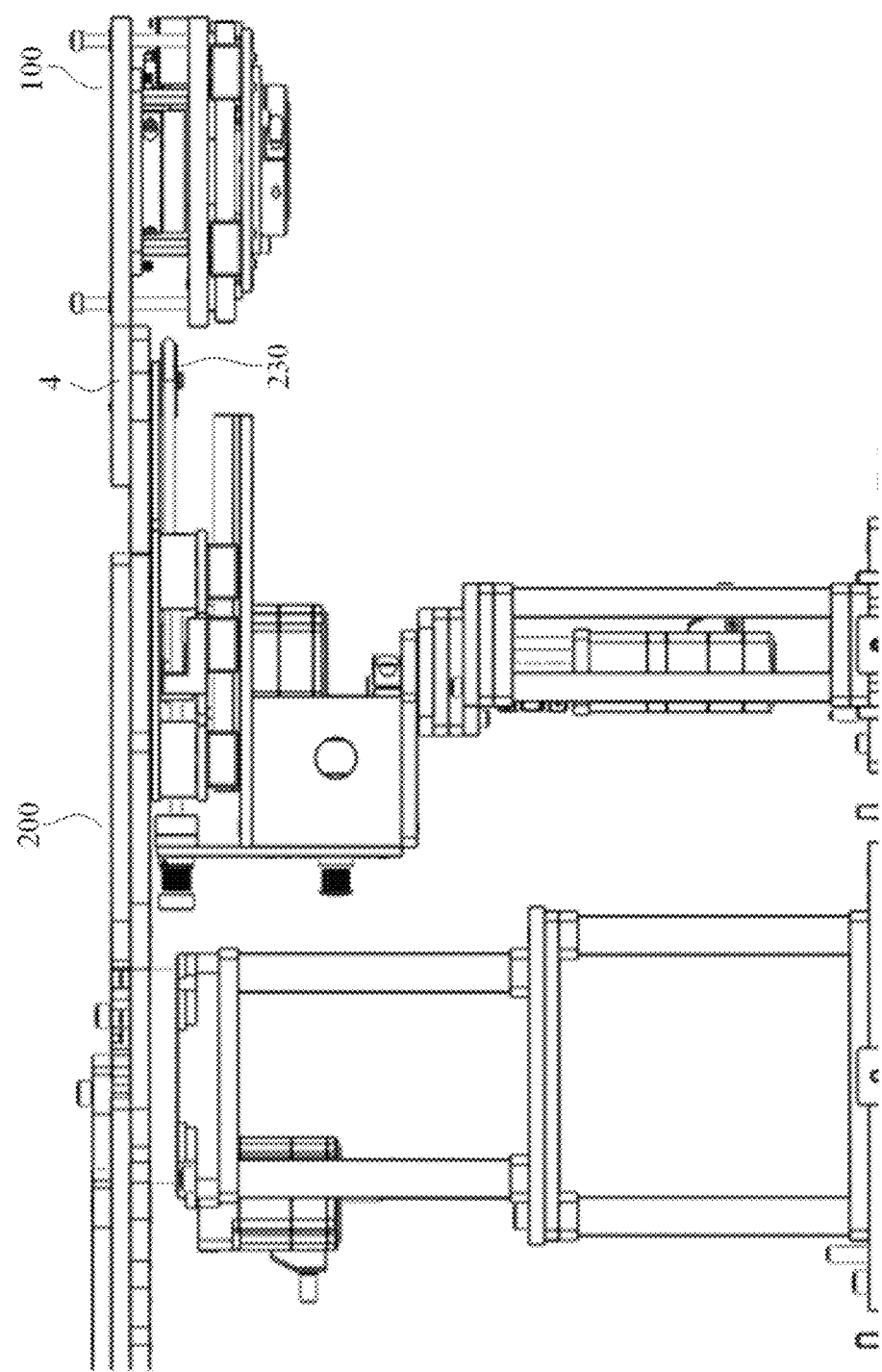
FIG. 12 is a view of the dispenser and dispensing station with the drive wheel disengaged according to an exemplary embodiment of the present disclosure.
Figure 13:
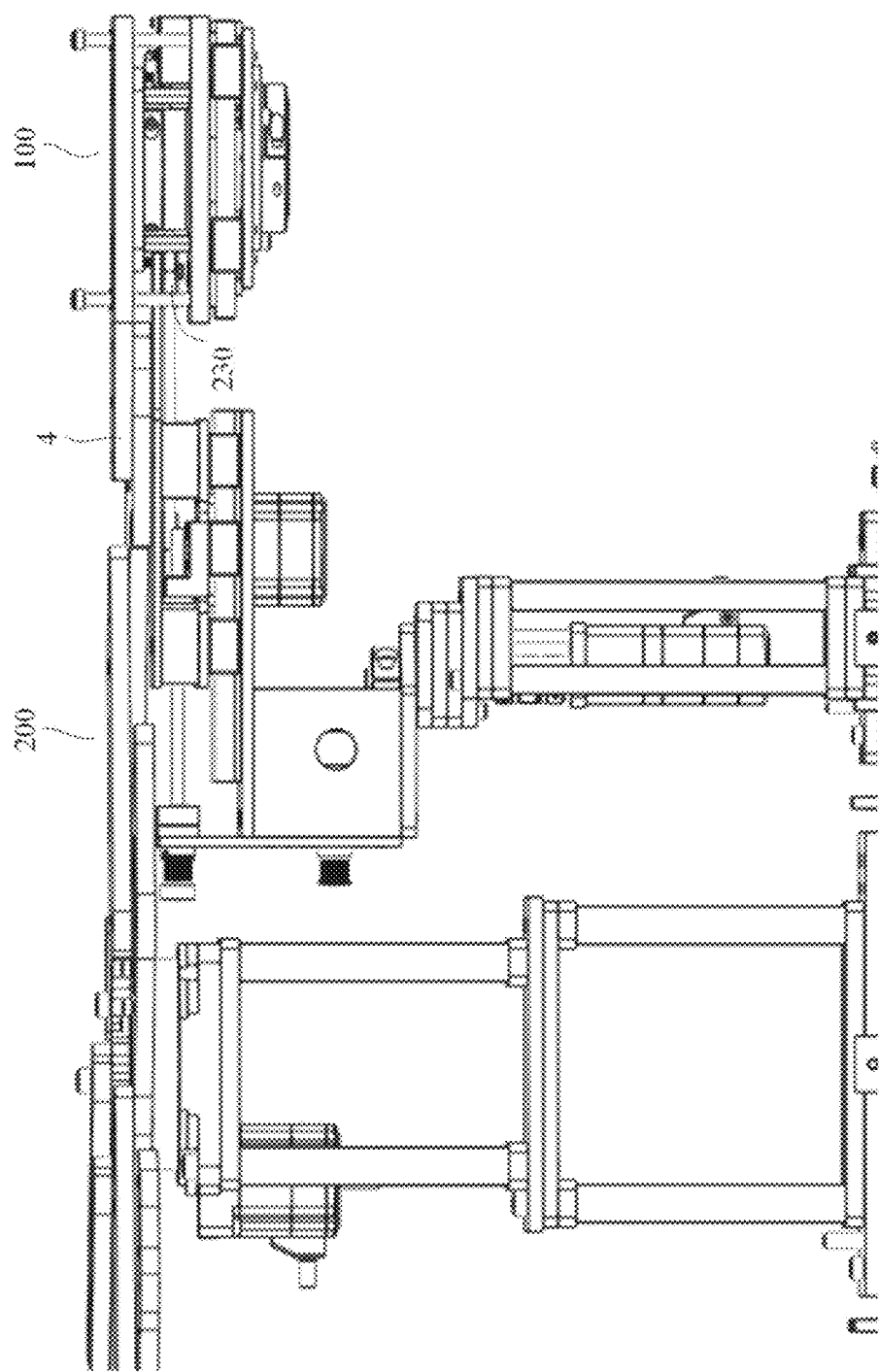
FIG. 13 is a view of the dispenser and dispensing station with the drive wheel engaged according to an exemplary embodiment of the present disclosure.

Referring to FIG. 6 and FIG. 7, the gate 13 is formed with a dispensing hole 63 on the bottom surface thereof and an open top end. The top end of the gate 13 surrounds and encloses the hopper 10 and a diameter of the gate 13 is equivalent to the diameter of the third insertion hole 53. The dispensing hole 63 is formed so that the dispensing hole 63 is aligned with a selected metering hole 60 when in the ON position, and misaligned with all metering holes 60 when in the OFF position. The diameter of the gate 13 is sufficiently large that the gate 13 may slide beneath the hopper 10 to allow the above ON or OFF configurations.

The gate hub 14 is disposed between the gate 13 and the lower base 3, and fixes the gate 13 to the lower base 3. In the present embodiment, the gate hub 14 is formed from two coupled gate hub portions 14a and 14b. Gate hub portions 14a of the gate hub 14 are mounted to the lower base 3. Gate hub portion 14b is coupled to the gate hub portion 14a. The gate hub portion 14b is removable. In this way, the hopper 10 and the gate 13 are withdrawn for cleaning and maintenance in some embodiments.

Figure 2:
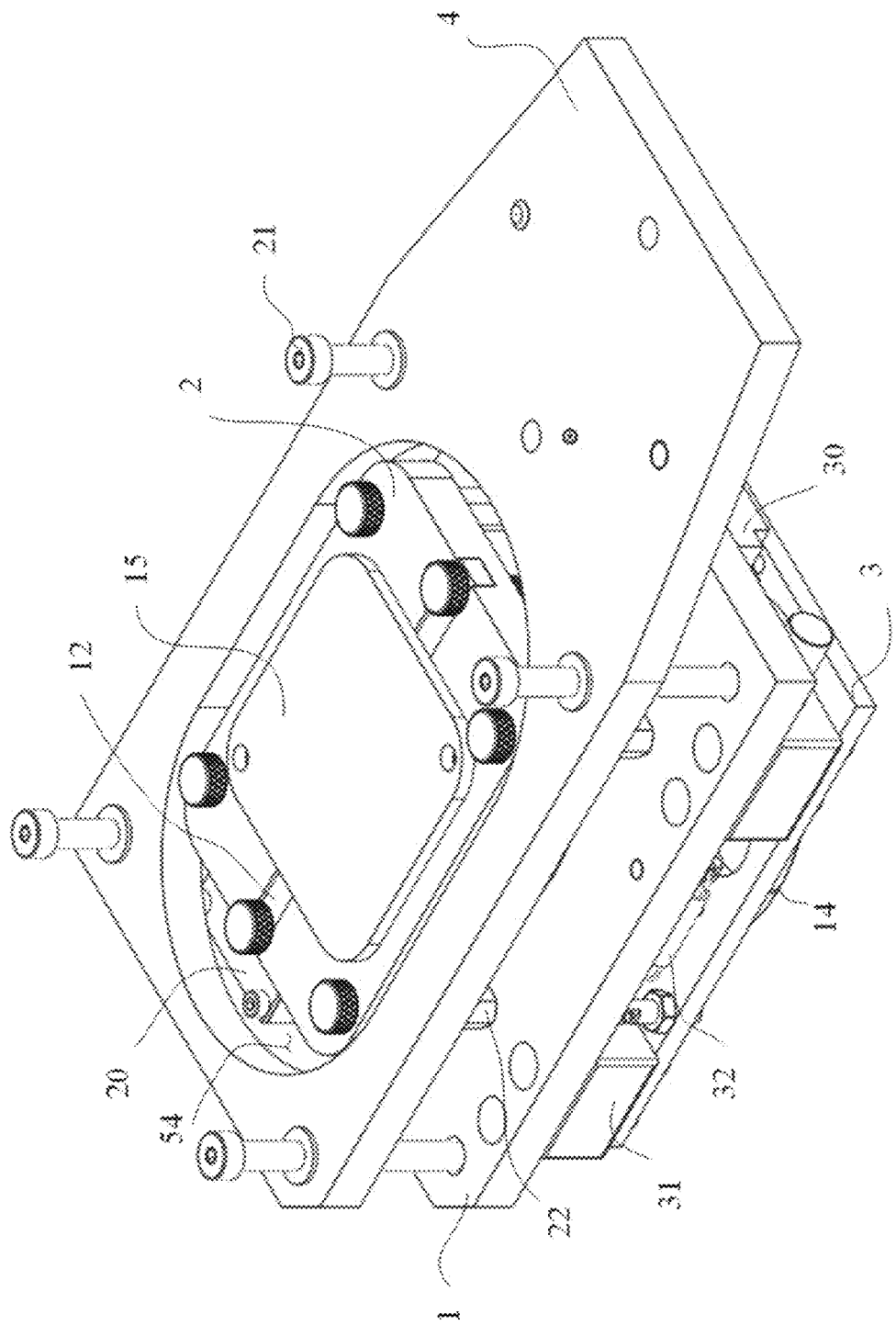
FIG. 2 is a view of the dispenser and fixing plate according to an exemplary embodiment of the present disclosure.

As shown in FIG. 2, the fixing plate 4 is formed with a fourth insertion hole 54 in the center thereof and fixes the dispenser 100 to the dispensing station 200. The fourth insertion hole 54 is formed in such a way that the aperture of the fourth insertion hole 54 is sufficiently large to accommodate the upper base 2 and prevent the upper base 2 and the fixing plate 4 from abutting during operation. The fixing plate 4 is coupled to the dispenser 100 using a plurality of spring-dampers 21. The spring-dampers 21 have (e.g., comprises) a first end disposed on the base 1 and a second end disposed through the fixing plate 4. The spring-dampers 21 isolate the vibration of the vibration device 20 so that only the dispenser 100 is agitated and oscillates as a whole assembly. In some embodiments, the size, elasticity, and damping force of the spring-dampers 21 varies depending on the design requirements. The present configuration is advantageous compared to the conventional dispensers, as the present disclosure prevents micro-impacts between members that vibrate independently, thereby improving the lifespan of the apparatus and reducing the required maintenance.

Figure 14:
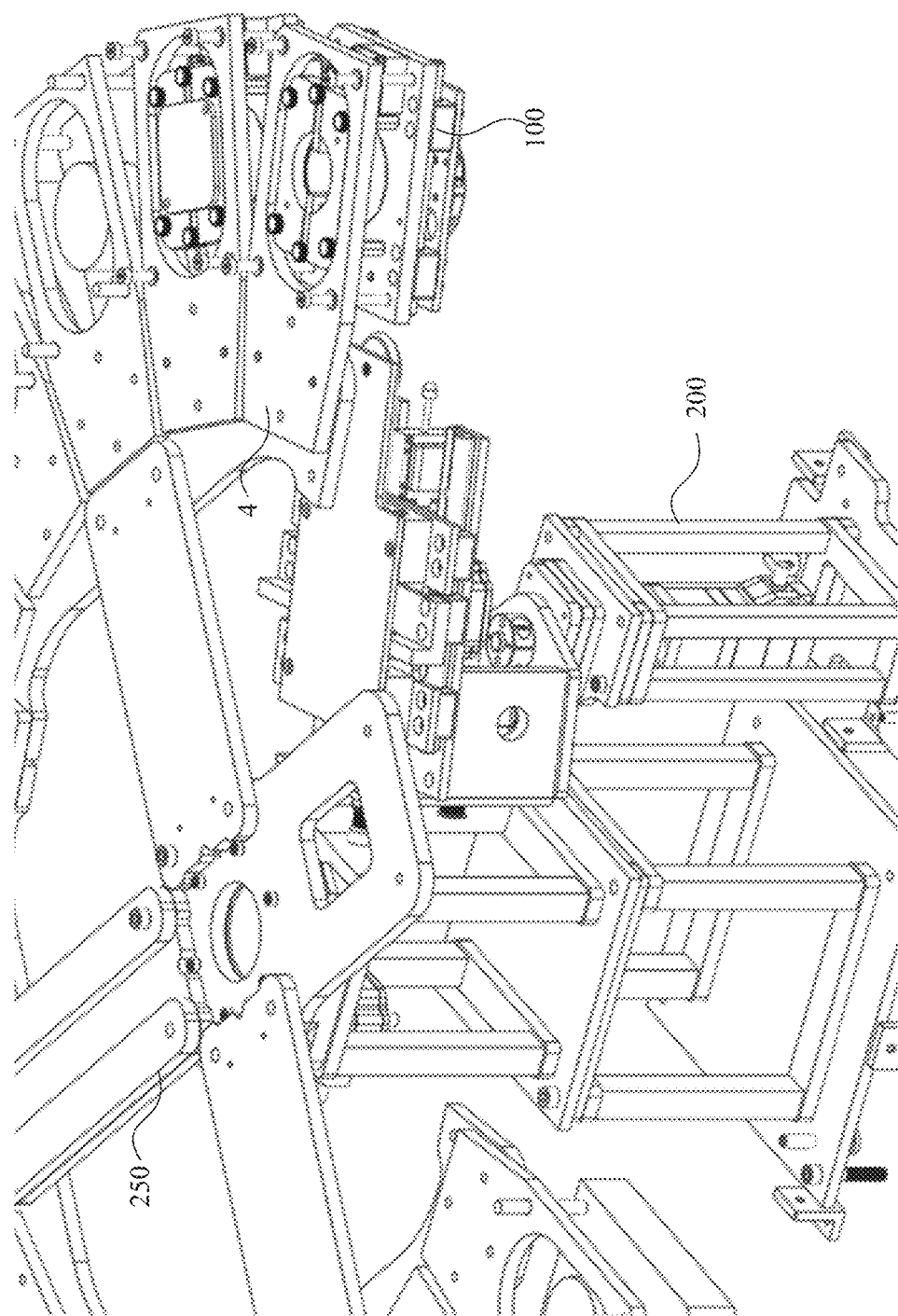
FIG. 14 is a view of the dispenser, fixing plate, dispensing station, and dial.
Figure 15:
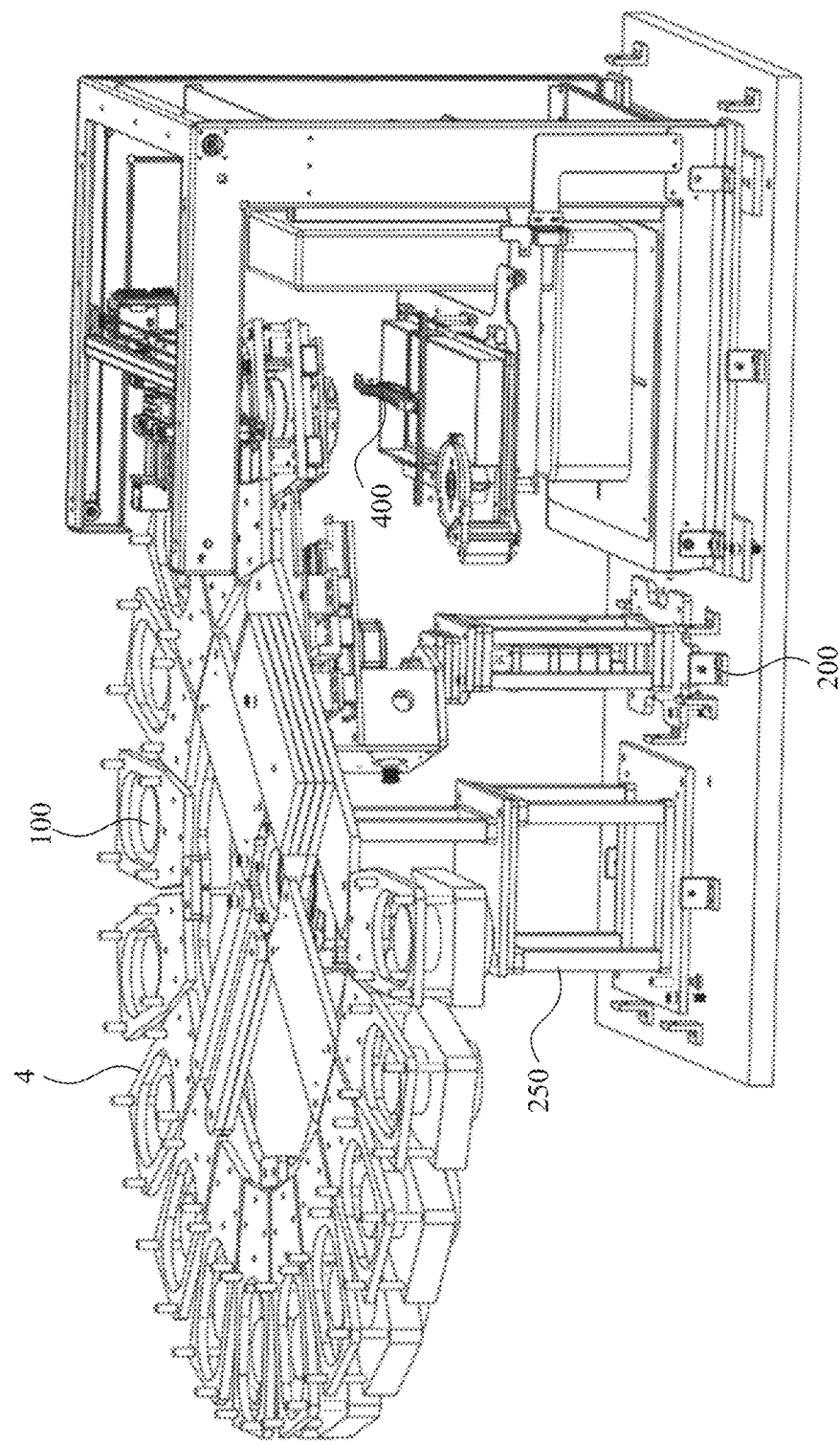
FIG. 15 is another view of the dispenser, fixing, dispensing station, and dial.
Figure 16:
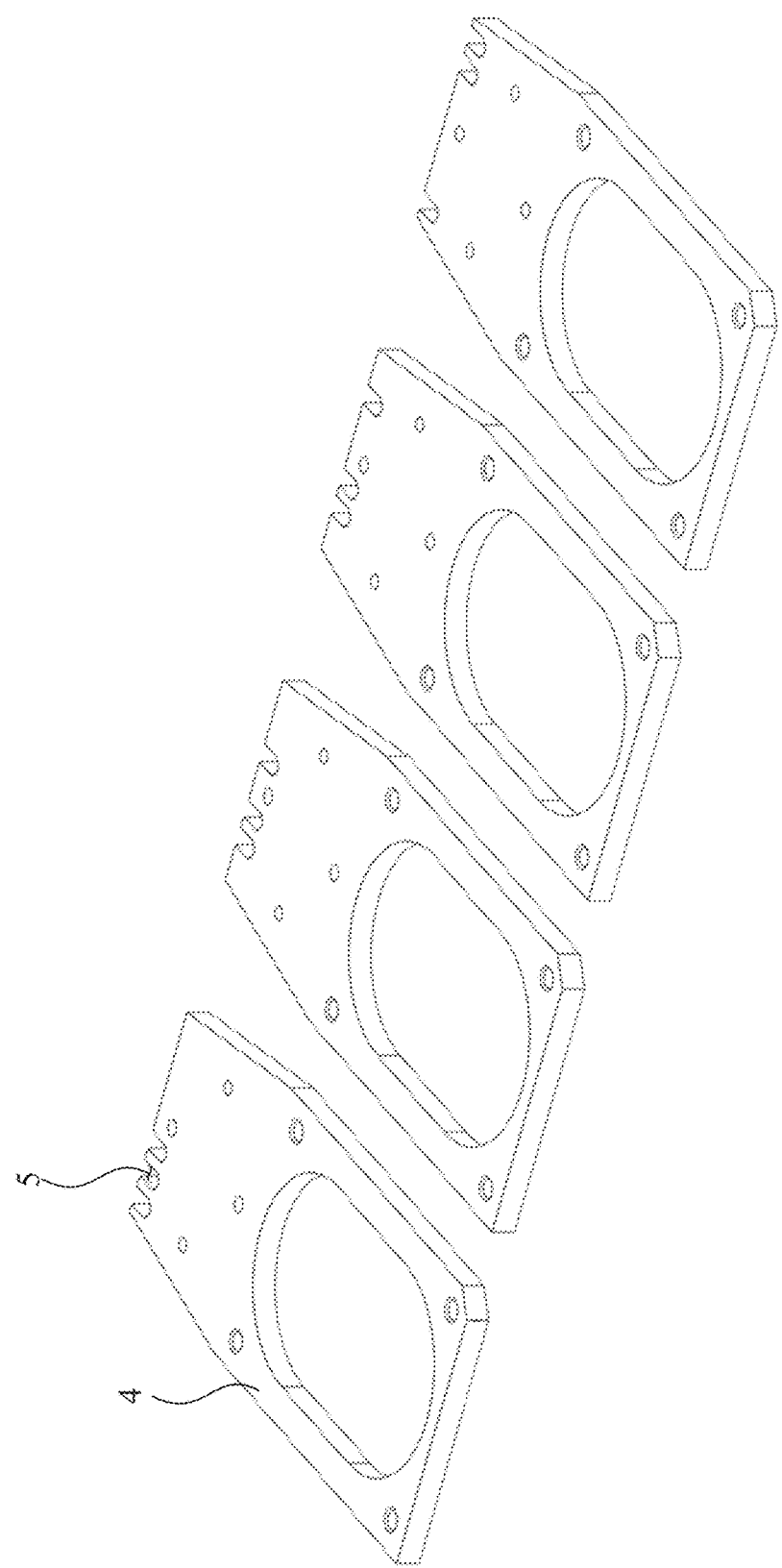
FIG. 16 is a view of the fixing plate and notches according to an exemplary embodiment of the present disclosure.
Figure 17:
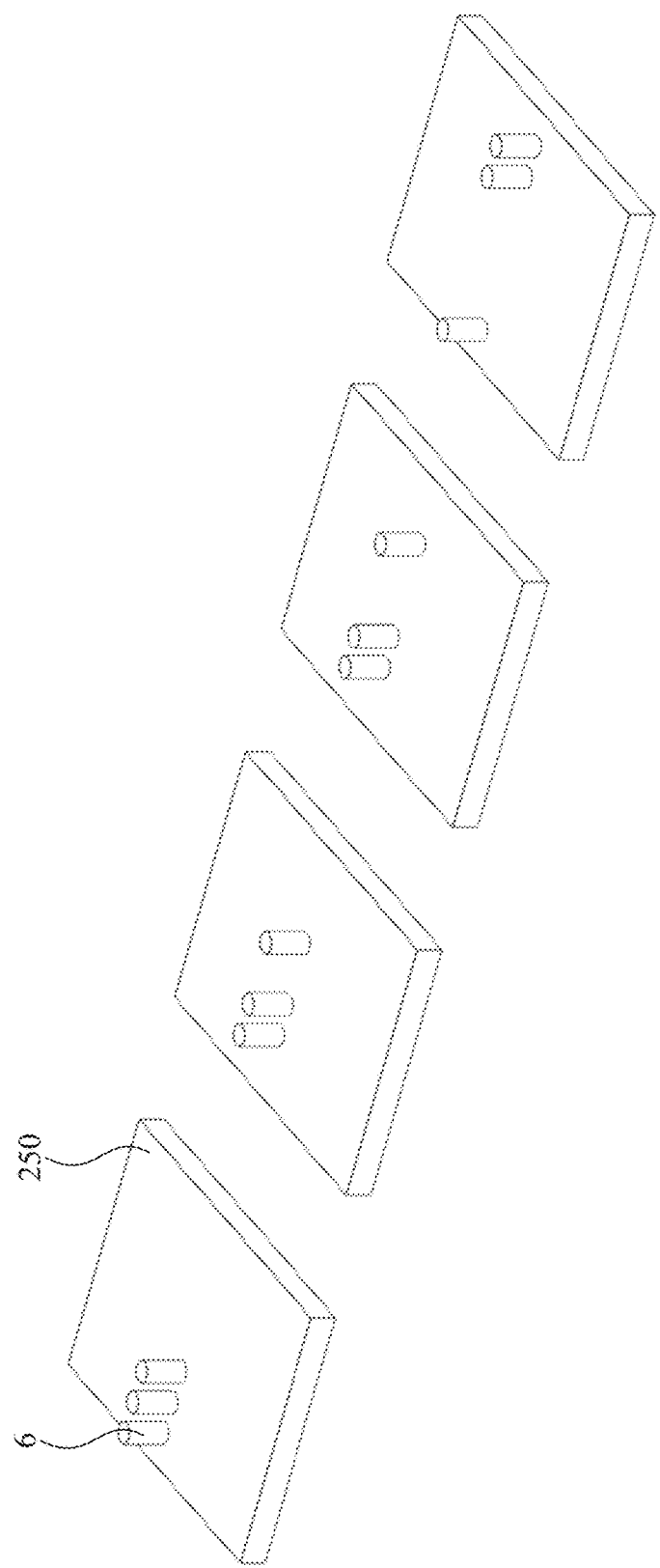
FIG. 17 is a view of the dial and pegs according to an exemplary embodiment of the present disclosure
Figure 18:
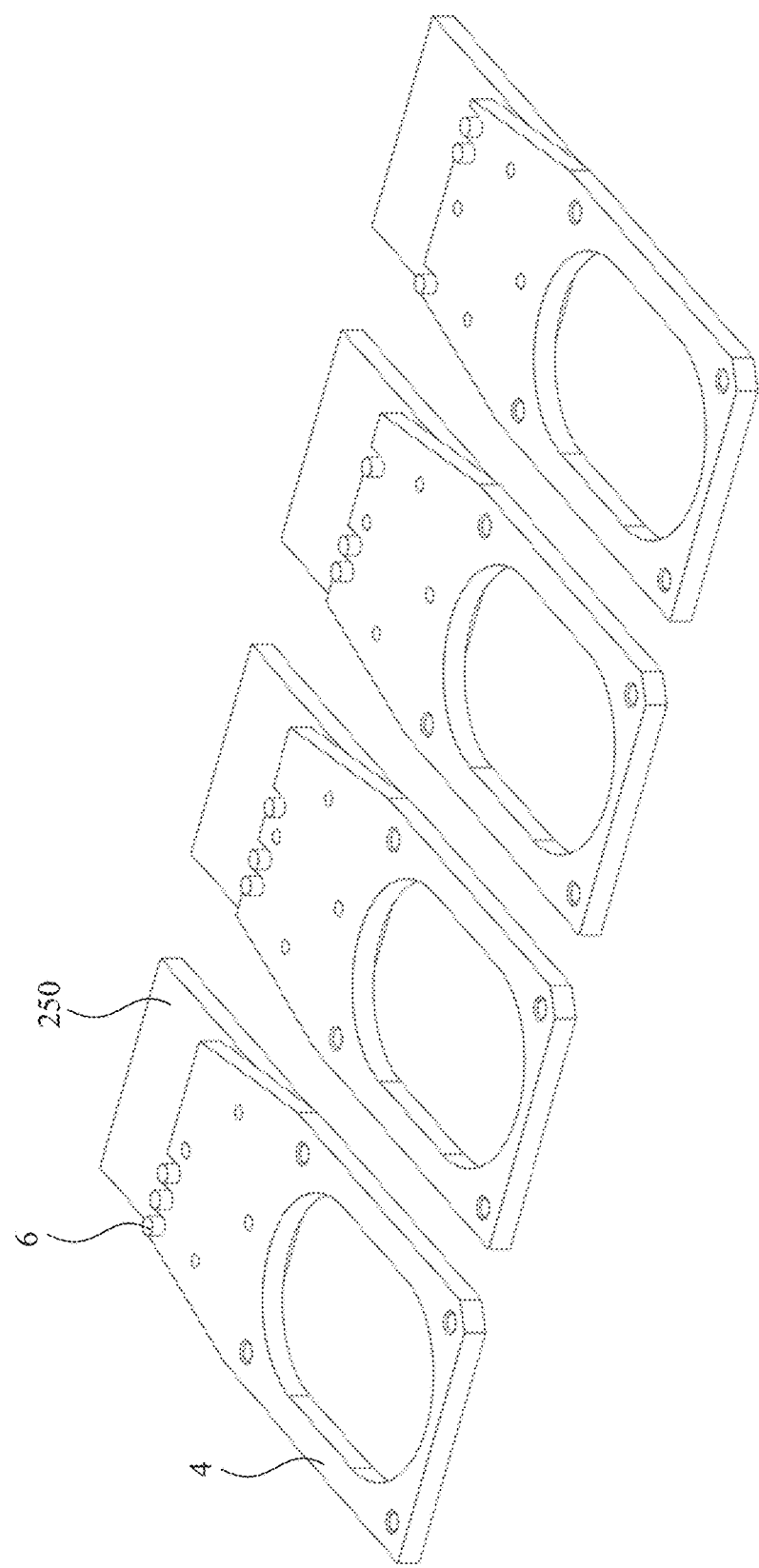
FIG. 18 is a view of the fixing plate and dial in the correct position according to an exemplary embodiment of the present disclosure.

Referring to FIG. 14 and FIG. 15 in some embodiments dial 250 is fixed to an end of the fixing plate 4 instead of the dispensing station 200. The dial 250 is configured to accommodate a plurality of the dispensers 100. The dial 250 is configured as a library of dispensers 100 (e.g., two dispensers, three four dispensers, four dispenser or more, 10 or more dispensers, or 20 or more dispensers), where a selected dispenser 100 can be oriented to the dispensing station 200. In some embodiments, the dial 250 comprises a gantry or robotic arm.

Figure 19:
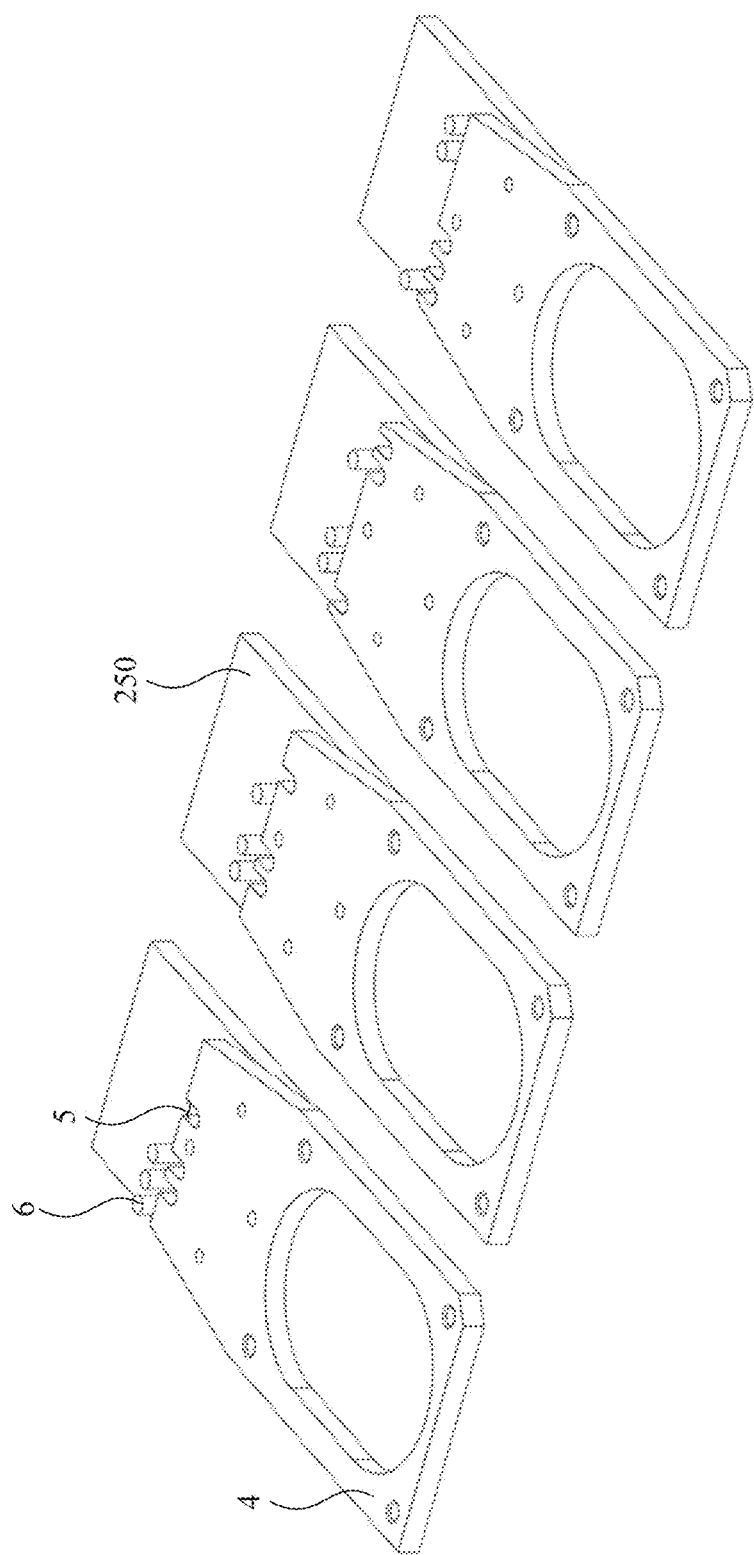
FIG. 19 is a view of the fixing plate and dial in the incorrect position according to an exemplary embodiment of the present disclosure.
Figure 20:
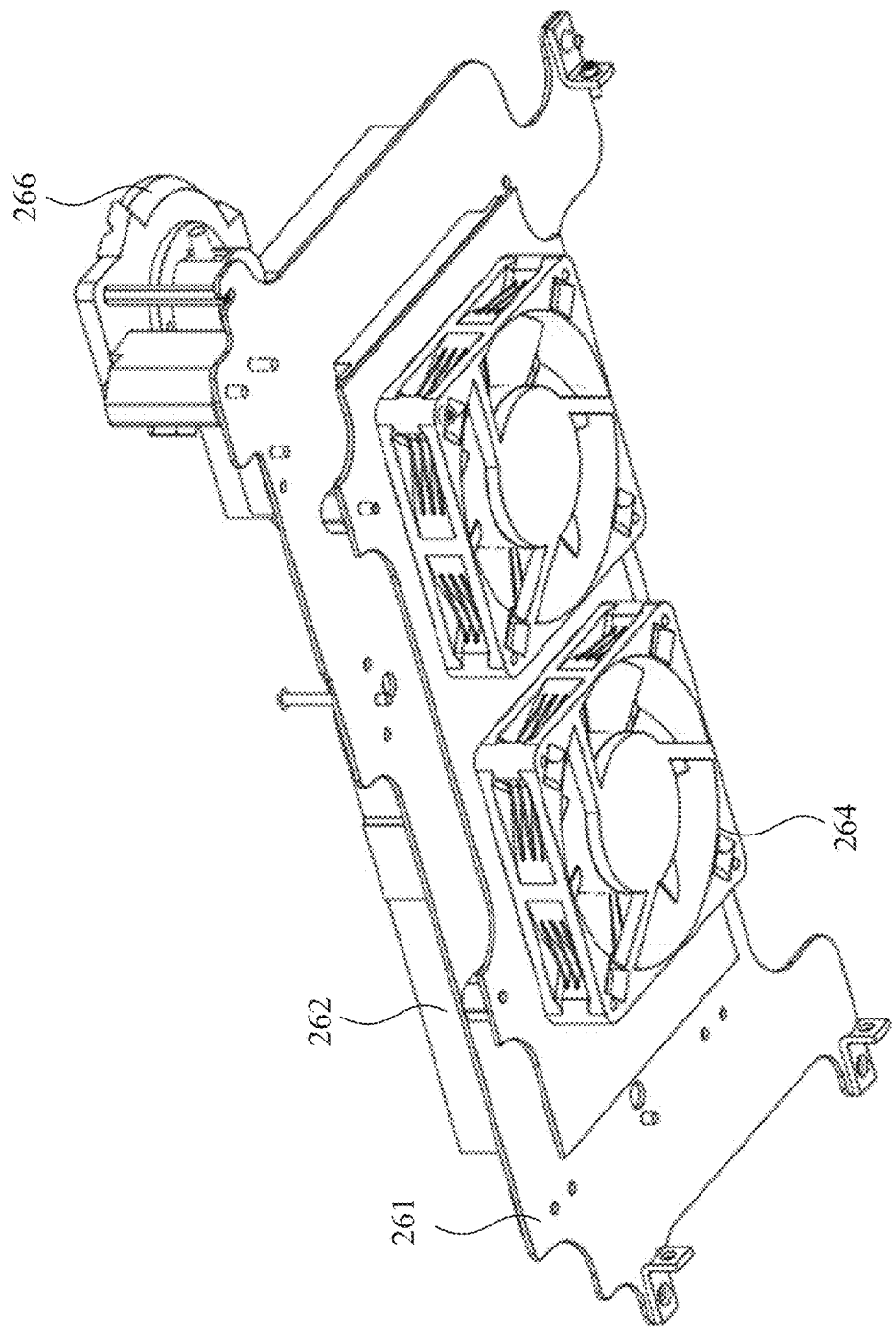
FIG. 20 is a view of the containment system according to an exemplary embodiment of the present disclosure.
Figure 21:
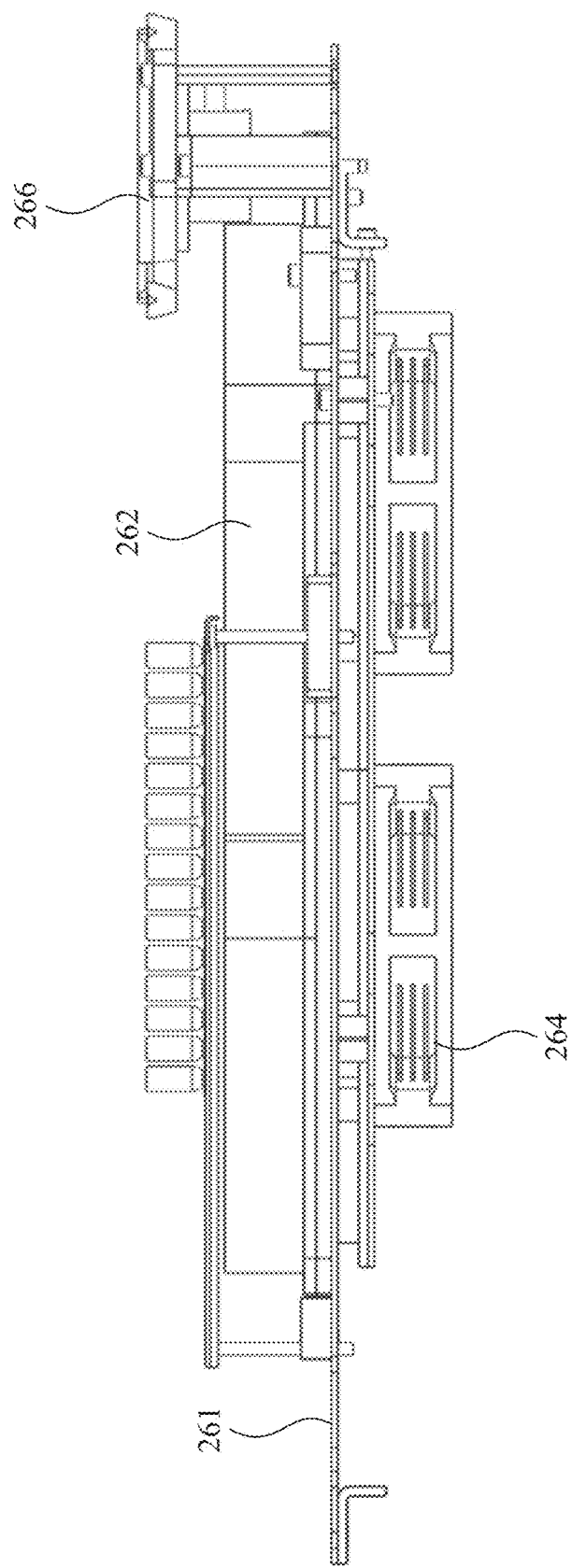
FIG. 21 is a view of the containment system according to an exemplary embodiment of the present disclosure.
Figure 22:
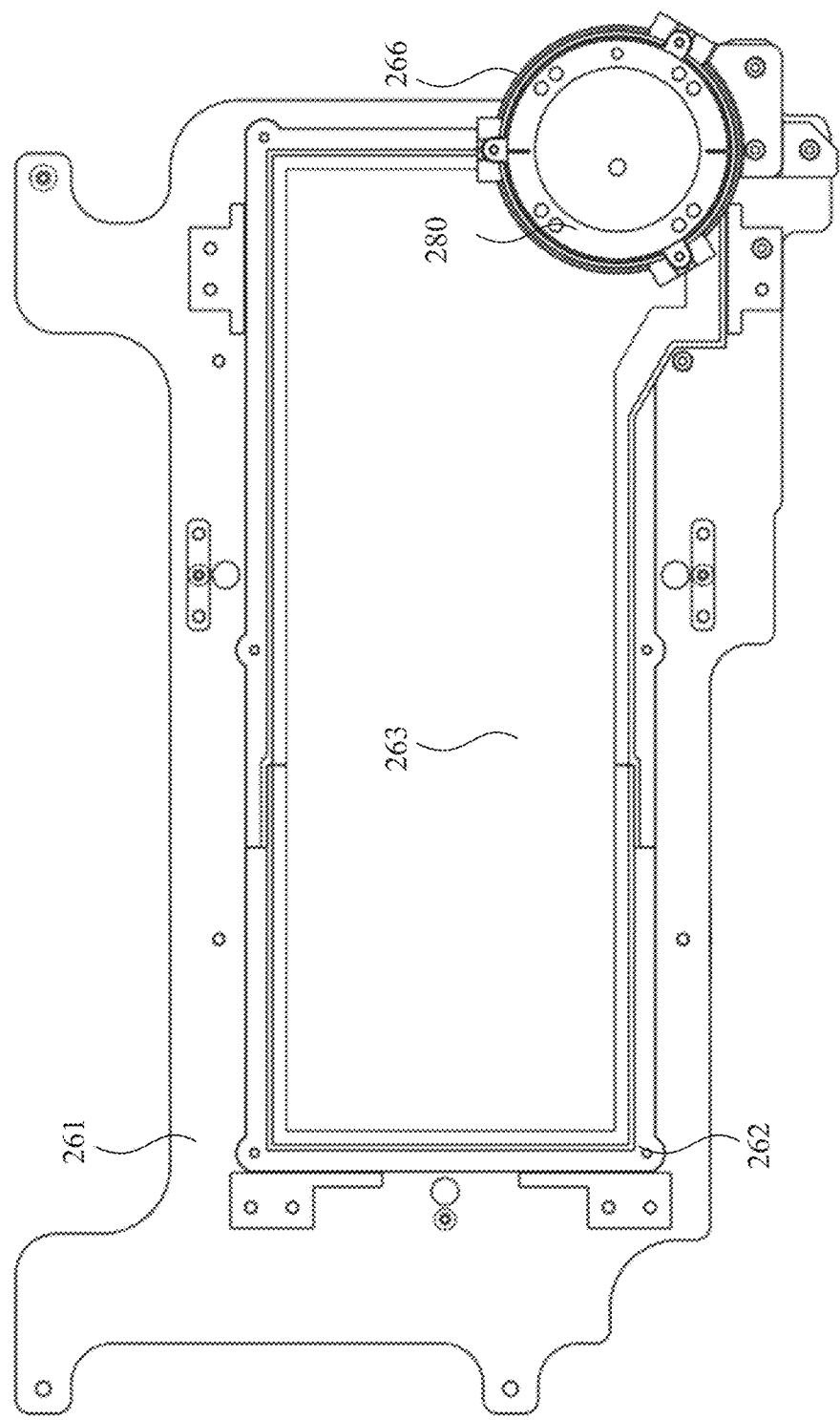
FIG. 22 is a plan view of the containment system according to an exemplary embodiment of the present disclosure.
Figure 23:
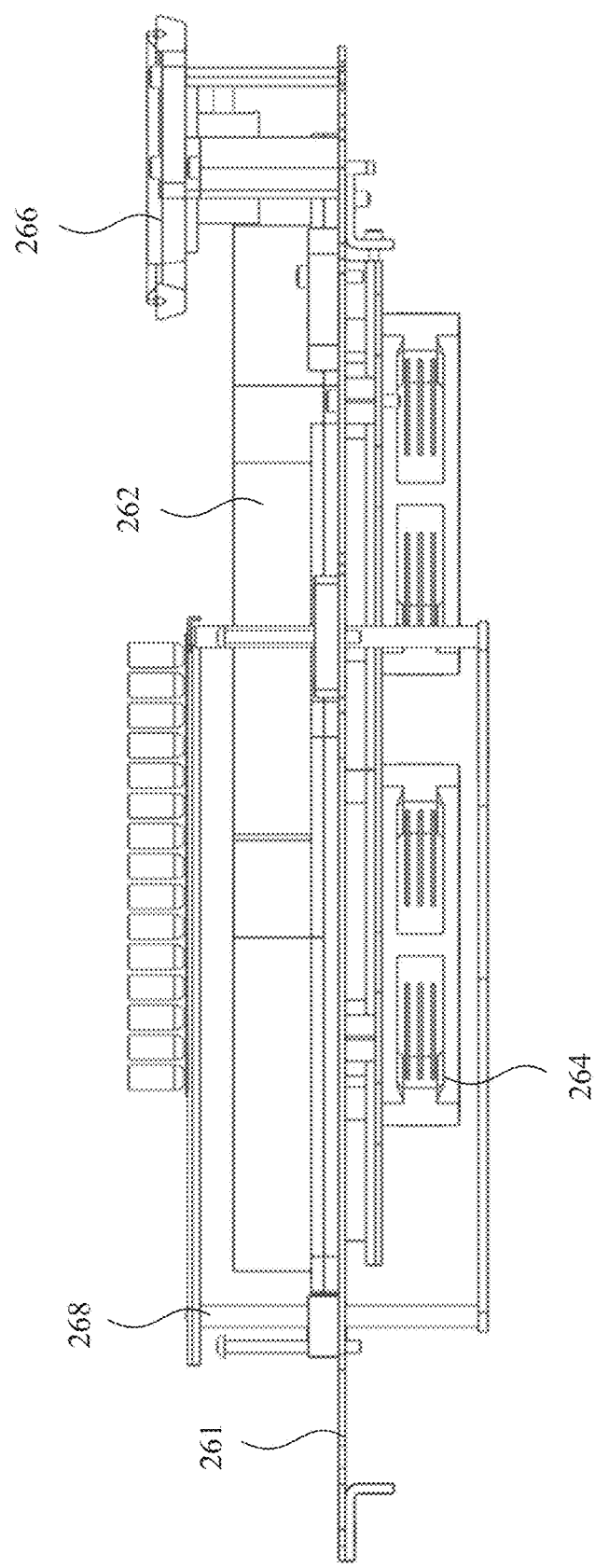
FIG. 23 is a view of the support prongs and the printing plate engaged according to an exemplary embodiment of the present disclosure.
Figure 24:
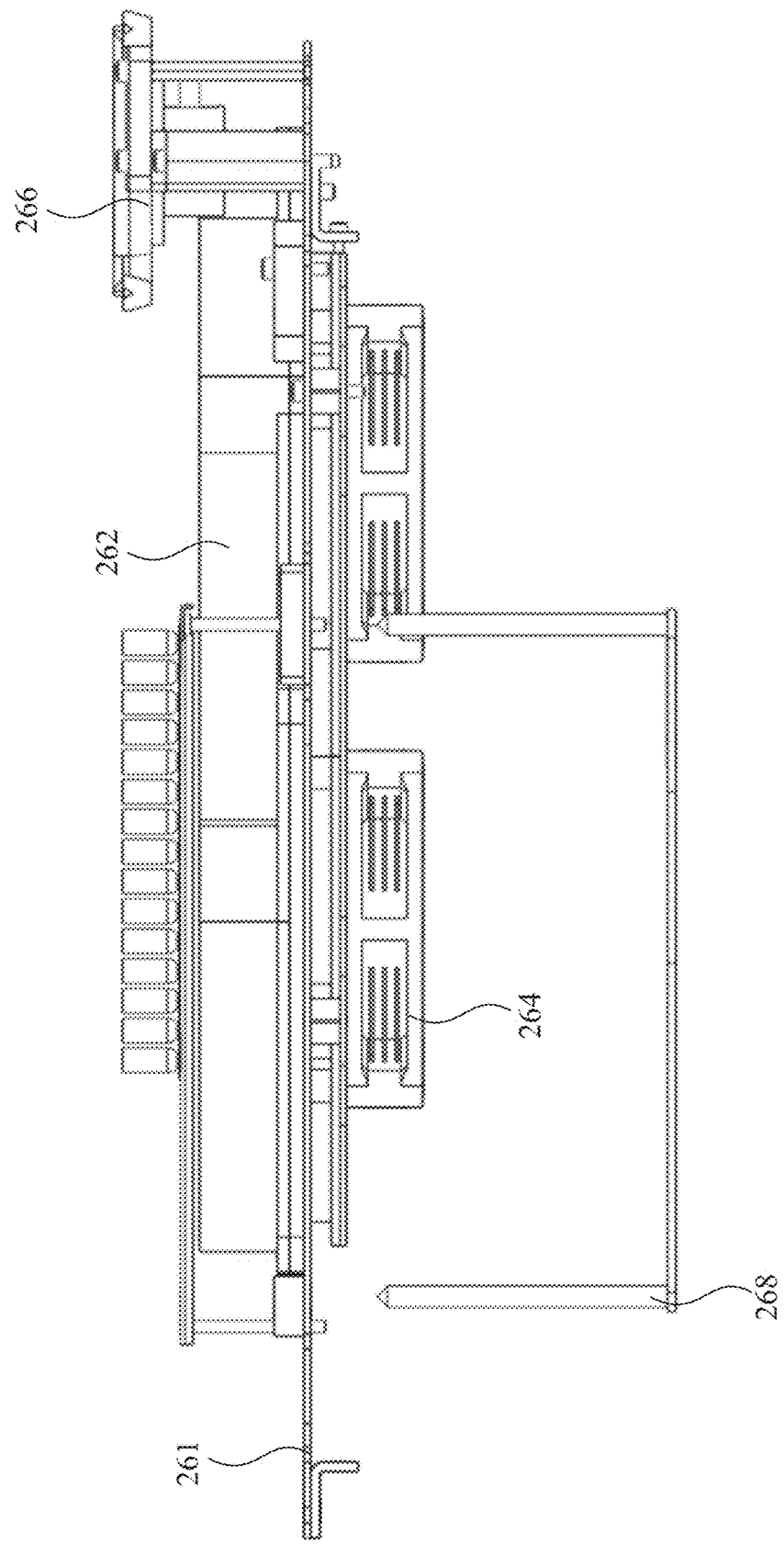
FIG. 24 is a view of the support prongs and the printing plate disengaged according to an exemplary embodiment of the present disclosure.
Figure 25:
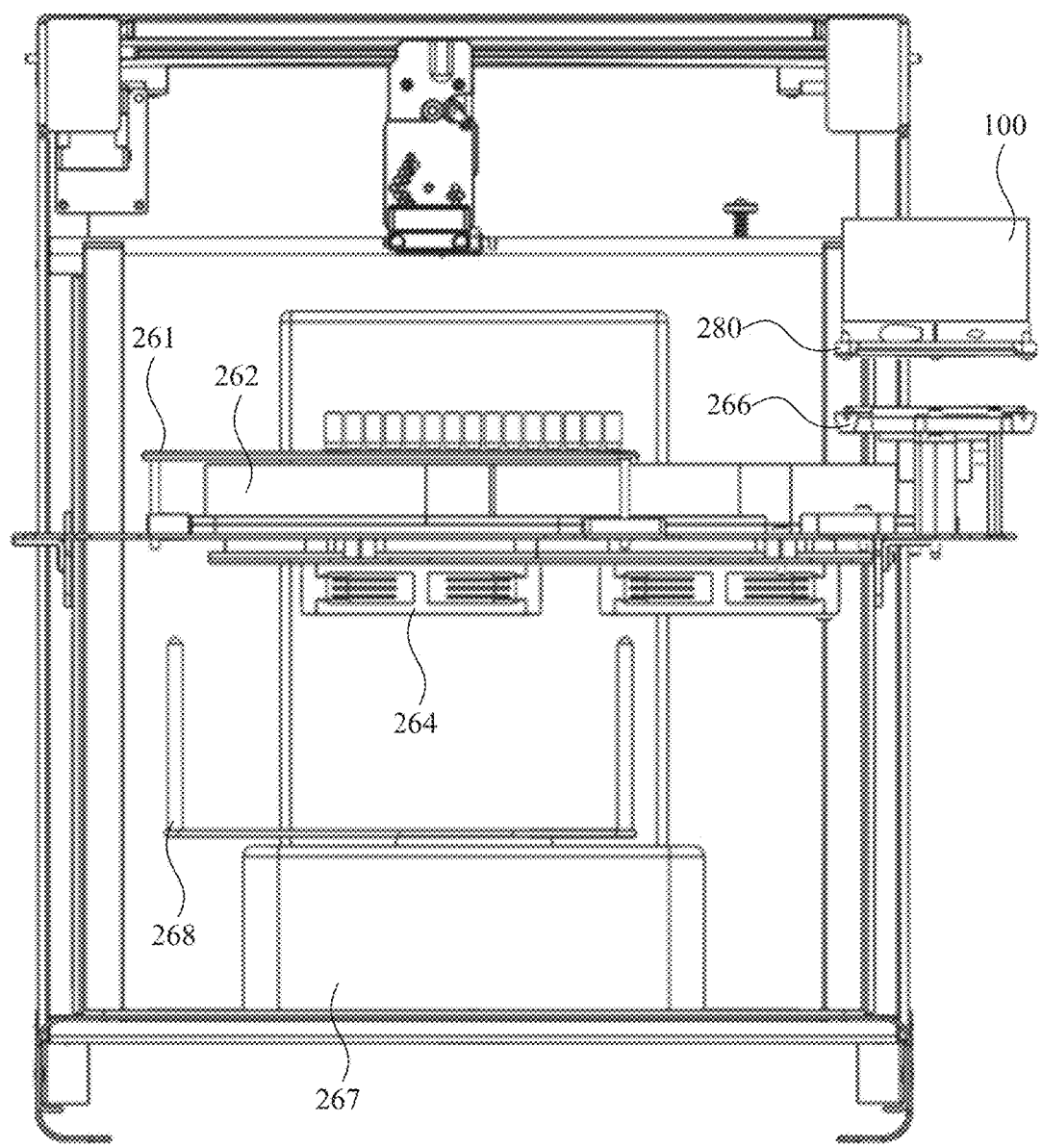
FIG. 25 is a view of the containment system and filament extruder according to an exemplary embodiment of the present disclosure.
Figure 26:
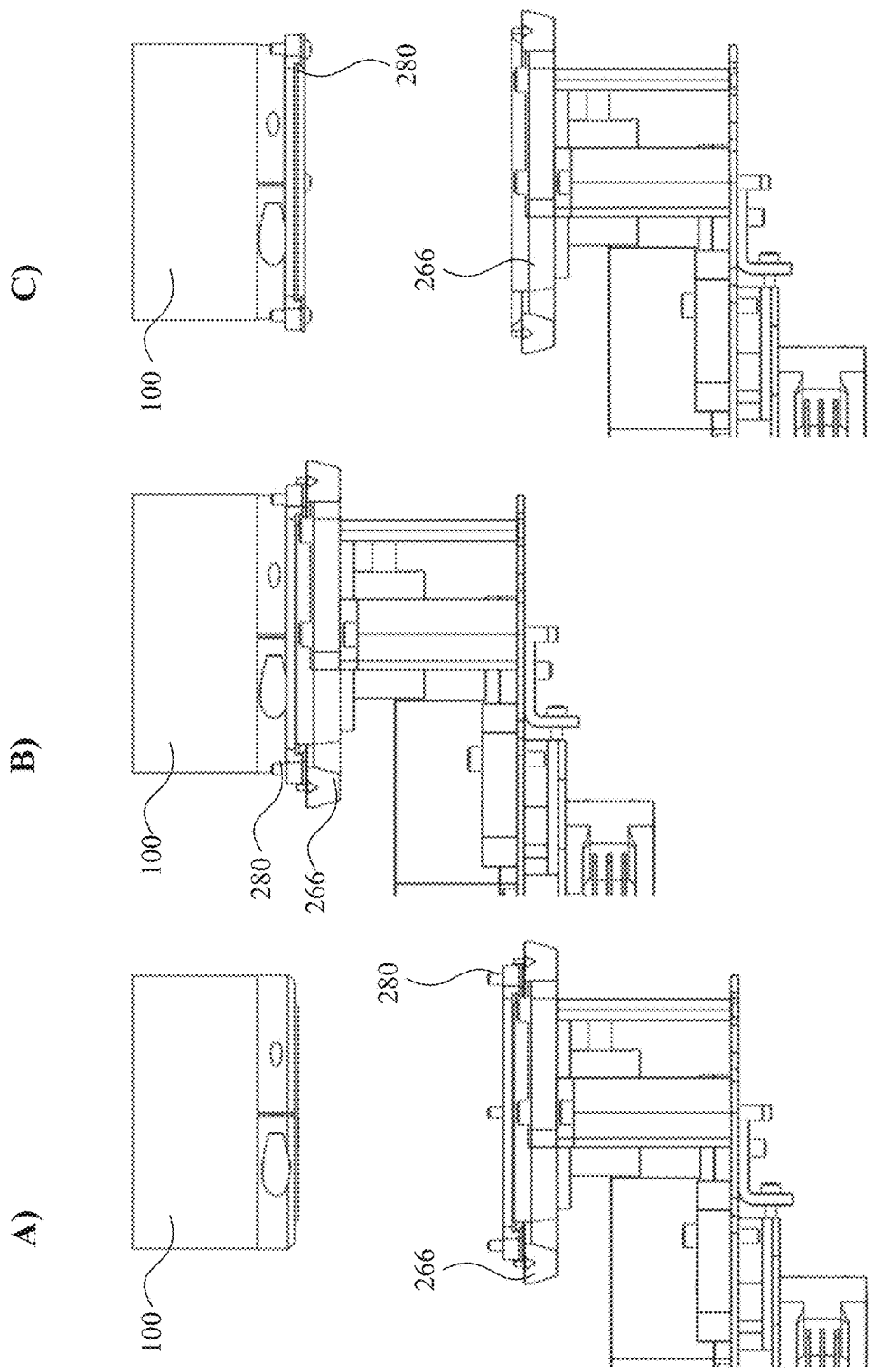
FIG. 26 is a view of the dispenser and docking station according to an exemplary embodiment of the present disclosure.
Figure 27:
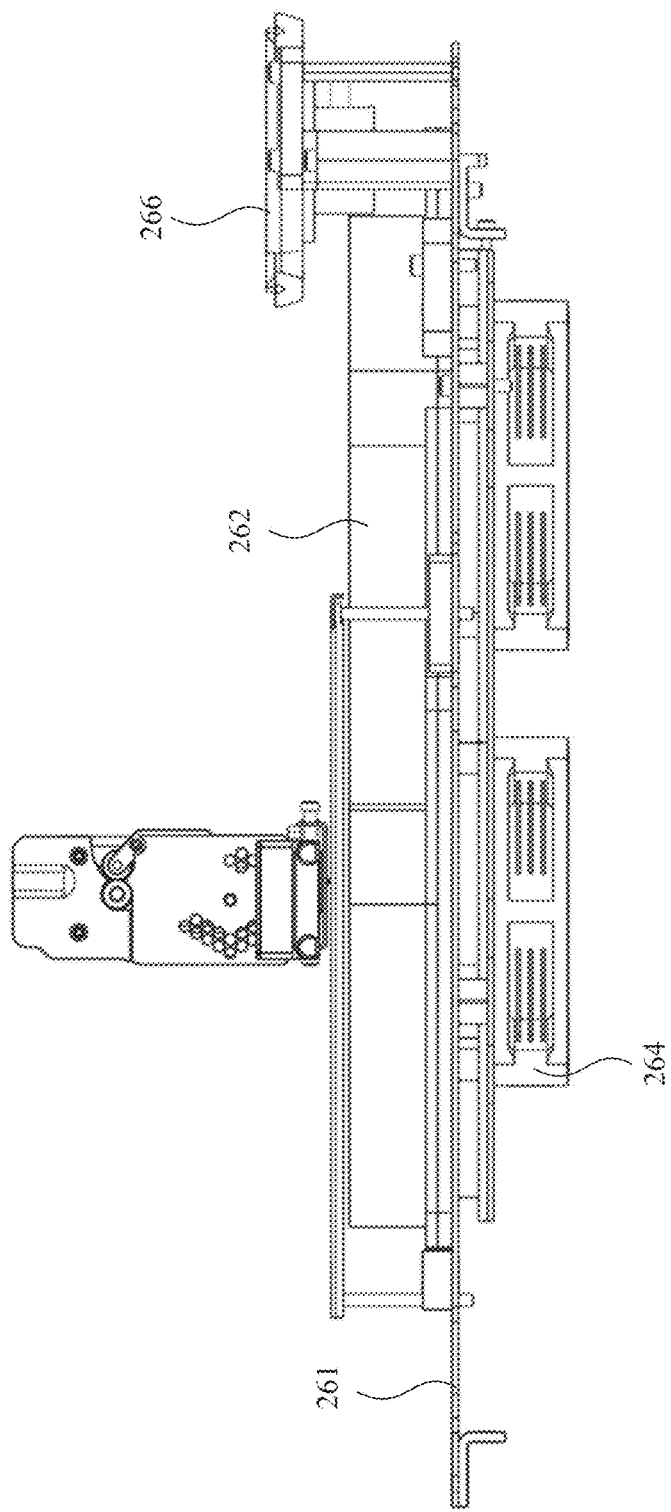
FIG. 27 is a view of the containment system and filament extruder according to an exemplary embodiment of the present disclosure.

Referring to FIG. 16 to FIG. 19, the fixing plate 4 and the dispenser 250 comprise a peg 6 and a notch 5 identification (ID) system. A plurality of dispensers 100 are fixed to the dial 250. Each fixing plate 4 comprises a unique array of the notches 5 disposed on an edge thereof. Each arm of the dial 250 comprises a matching array of the pegs 6 formed in such a way that each dispenser 100 can only be fixed to the matching arm of the dial 250. As shown in FIG. 19, when the notch 5 and peg 6 are not aligned, the dispenser 100 cannot be fixed to the dial 250 thereby ensuring the correct dispenser is fixed to the correct arm of the dial 250. The present configuration ensures that a computer control system (not shown) always knows which of the dispensers 100 is located and which dispenser 100 should be activated.

In some embodiments, a detector 40 is disposed on the dispenser 100, and is configured to communicate with a central controller (not shown). In some such embodiments, the detector 40 communicates the position, velocity, or acceleration of the hopper 11, and or the amplitude or frequency of the vibration device 20.

Referring to FIG. 8 to FIG. 11, the dispensing station 200 of one aspect of the present disclosure comprises a stationary base 205 configured to be fixed at the center of rotation of the system and act as a central anchor to the dispensing station 200. The station further comprises an upper base 215 housing the second, third, and fourth actuators 222, 223, and 224. The station further comprises a platform 210 that distances the upper base 215 and the stationary base 205. The station further comprises a first actuator 221 that rotates the upper base 215 about a horizontal plane, a second actuator 222 that engages a drive wheel 230 with the hopper hub 11, a third actuator 223 that rotates the drive wheel 230, and a fourth actuator 224 that engages a transfer block 30.

The stationary base 205 mounts the dispensing system to a desired external mounting fixture. The lower end of the stationary base 205 is fixed and the upper end of the stationary base 205 is disposed with the first actuator 221. In the present embodiment, the stationary base 205 is formed from a plurality of individual plates and bars. The total height and modularity of the stationary base 205 is adjusted, serving as a counterweight, however the present disclosure is not limited thereto. For instance, in some embodiments the base 205 is formed integrally. The first actuator 221 is configured to couple the stationary base 205 with the platform 210 and to rotate and orient the platform 210 and the upper base 215. In some embodiments, the first actuator 221 is coupled to the dial (not shown) and rotates and orients a dispenser 100 from a plurality of dispensers 100 to the dispensing station 200.

As described above, the platform 210 is coupled to the stationary base 205 using the first actuator 221. The upper end of the platform 210 is coupled to the upper base 215 using the second actuator 222. The second actuator 222 is configured to slide the upper base 215 along the platform 210 wherein the drive wheel 230 will engage and disengage with the hopper hub 11 according to the sliding motion of the upper base 215.

The upper base 215 is disposed above the platform 210 and houses the drive wheel 230 and the third and fourth actuators 223 and 224. The drive wheel 230 is transfers rotational energy from the third actuator 223 to the hopper hub 11. In the present embodiment, the drive wheel 230 is a drive belt, but is not limited thereto. The third actuator 223 drives the drive wheel 230. The fourth actuator 224 is disposed below the third actuator 223 and engages the transfer block 30 of the dispenser 100. The fourth actuator 224 is responsible for switching the gate 13 to or from the ON or OFF positions. In the present embodiment, the transfer block 30 is disposed on the lower base 3 to assist the fourth actuator 224 in engaging the assembly. However, the present disclosure is not limited thereto. For instance, in alternative embodiments, the fourth actuator 224 engages the lower base 3 or engages the gate 13 directly, thereby omitting the transfer block 30.

In some embodiments, the dispensing station 200 comprise a central controller (not shown) that controls the vibration device 20, the detector 40, the dial (not shown), and the actuators 221, 222, 223, and 224. The central controller may be physical hardware (e.g., one or more microprocessors), software (e.g., drivers) on an external computer, or combinations thereof.

Referring to FIG. 6, FIG. 7, FIG. 12 and FIG. 13, the operation of the dispenser 100 and dispensing station 200 are exemplified. In the OFF position, the second actuator 222 slides the upper base 215 towards the dispenser 100. In the extended ON position, the drive wheel 230 is engaged with the hopper hub 11. As the third actuator 223 drives the drive wheel 230, the rotational energy is transferred to the hopper hub 11 and the hopper 10, thereby rotating the hopper 10 about the stirrer 12. As the hopper 10 rotates, the dispensing material is supplied to the metering holes 60 using the stirrer 12. Once a selected metering hole 60 has been filled, the hopper 10 rotates wherein the selected metering hole 60 is covered by the stirrer 12 to prevent additional dispensing material from entering the selected metering hole 60. The fourth actuator 224 then engages with the transfer block 30 so that the lower block 3 and its constituent components, including the gate 13, slide with the transfer block 30. The lower base 3 slides to a position in which the dispensing hole 63 and the selected metering hole 60 are aligned in the ON position. The vibration device 20 is activated to promote the flow of dispensing material, and the dispensing material is free to flow from the metering hole 60 through the dispensing hole 63 and onto a target surface. As the fourth actuator disengages the transfer block 30 the restoring force of the gate spring 32 forces the lower base 3 to its initial position. In the case that a second, or multiple, dispensing materials are required, the first actuator 221 orients a second dispenser 100 of the dial 250 to the dispensing station 200, and the above process is repeated.

In some embodiments, material is supplied to a single metering hole 60 and then released. In another embodiment, material is supplied into a sequence of metering holes 60 and then released in a predetermined sequential order. In a further embodiment, material is supplied into a sequence of metering holes 60 in a sequence of dispensers 100, and then released in a predetermined sequential order.

Referring to FIG. 20 to FIG. 27, in some embodiments the dispensing system comprises a containment system and a support structure configured to contain a dispensed material and determine the mass of a dispensed material from the dispenser apparatus. The containment system comprises a primary base 261 formed with a plurality of holes allowing a plurality of prongs 268 of the support structure to penetrate through. A bin 262 is disposed on a top surface of the primary base 261, and configured to accommodate a screen 263. The screen 263 is configured to filter a dispensed material using a first fan 264. In the present embodiment, the screen files particles at the micron scale; however, the present disclosure is not limited thereto.

The first fan 264 draws air through the screen 263. In the present embodiment, the containment system comprises a plurality of fans 264 that draw air in through the screen 263.

In some embodiments, a printing plate 265 is disposed above the bin 262, formed in a 'T'-shape, and is configured to be a target dispensing location. However, the present disclosure is not limited thereto. For instance, in another embodiment the printing plate 265 is formed in an 'I' or plate shape.

The support structure comprises a balance 267 configured to determine the mass of a dispensed material. Disposed on the balance are the plurality of prongs 268 which penetrate the plurality of holes of the primary base 261 and support the printing plate 265. During a dispensing operation, the support prongs 268 are disengaged from the printing plate 265. After a dispensing operation, the support prongs 268 lift the printing plate 265 so that the printing plate 265 is suspended from the bin 262 and is capable of being measured by the balance 267. In some embodiments, the balance continuously determines, or determines on an automated recurring basis, the mass of dispensed material. The dispenser 100 ceases operation when the mass of dispensed material is equal to a predetermined value.

In some embodiments, a docking station 266 is disposed on the containment system and accommodates the end cap 280. The end cap 280 is magnetically disposed on the bottom surface of the lower base 2 of the dispenser 100. When a dispenser 100 is not in use, the end cap 280 covers the gate 13 and gate hub 14 so that no material can be dispensed. The end cap 280 is removed by the docking station 266 when the dispenser 100 is selected for operation. When the dispenser 100 is selected for operation, the dispenser moves over the docking station 266 and the end cap 280 is removed. After a dispensing operation ceases, the dispenser 100 moves over the docking station 266 again, and the end cap 280 is reapplied.

Accordingly, a dispensing system according to an exemplary embodiment of the present disclosure achieves the advantages of a reduction in the total number of actuators required for operation, reduction in the risk of contamination of the dispensing material, eliminates galling and micro-impacts using as few moving parts as possible, designed for simplicity and reduced cleaning and maintenance, and is modular wherein a single dispensing station may operate a plurality of dispensers.

For convenience in explanation and accurate definition in the appended claims, the terms "upper", "lower", "up", "down", "upwards", "downwards", "inner", "outer", "inside", "outside", "inwardly", "outwardly", "interior", "exterior", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various alternatives and modifications thereof. It is intended that the scope of the invention be defined by the Claims appended hereto and their equivalents.

What is claimed is:

1. A dispensing system comprising a dispenser apparatus, the dispenser apparatus comprising:
   a main base with a first insertion hole for receiving a hopper;
   an upper base disposed above the main base, the upper base comprising a second insertion hole for receiving a stirrer;
   one or more spacers that distance the upper base from the main base;
   a lower base disposed below the main base, the lower base comprising a third insertion hole for receiving a hopper with an aperture larger than a diameter of the hopper, and coupled to the main base by a linear guide;

a hopper disposed in the first insertion hole, wherein the hopper comprises a top opening and a first bottom surface formed with one or more metering holes, wherein the hopper rotates about a central plane;

a stirrer disposed inside the hopper and fixed to the upper base, wherein the stirrer is configured to feed material into the one or more metering holes;

a gate disposed on a second bottom surface of the lower base and under the hopper, wherein the gate comprises a top opening and a third bottom surface formed with a dispensing hole, and wherein the top opening has a size greater than the size of the hopper;

a gate spring having a first end and a second end, wherein the first end is disposed on a fourth bottom surface of the main base and the second end disposed on an upper surface of the lower base, the gate spring being mounted parallel to the sliding motion of the lower base; and a vibration device, wherein the vibration device is configured to agitate the assembly disposed on the main base.

2. The dispensing system according to claim 1, wherein the volume defined by the one or more metering holes defines a predetermined volume of material to be dispensed.

3. The dispensing system according to claim 1, wherein the stirrer covers the metering hole currently selected to dispense.

4. The dispensing system according to claim 1, wherein the stirrer comprises one of a chamfer edge, auger or plate shape, or bent tube that is configured to regulate a supply of material into metering holes of the hopper.

5. The dispensing system according to claim 1 in which the apparatus is configurable between
a first position in which an aperture of a selected metering hole and an aperture of the dispensing hole are misaligned, and
a second position in which an aperture of a selected metering hole and an aperture of the dispensing hole are aligned.

6. The dispensing system according to claim 1, wherein the sliding of the gate determines a dispensing state of the dispensing apparatus that is one of ON and OFF.

7. The dispensing system according to claim 1, wherein the upper base further comprises a removable lid covering the second insertion hole.

8. The dispensing system according to claim 1, wherein
the gate is encompassed by a removable gate hub that fixes the gate to the lower base, and
the gate hub is formed as two parts that permit removal of the gate.

9. The dispensing system according to claim 1, wherein
the gate is encompassed by a removable end cap that blocks the dispensing hole when the dispensing apparatus is not in operation, and
the end cap is magnetically disposed on the fourth bottom surface of the gate.

10. The dispensing system according to claim 1, further comprising a hopper hub disposed between the first insertion hole and the hopper, wherein the hopper hub is configured to transfer rotational energy to the hopper.

11. The dispensing system according to claim 1, further comprising a detector configured to perform a procedure comprising:

detecting and calibrating a position of the hopper and the one or more metering holes, and
electronically communicating the position of the hopper with a central controller or software.

12. The dispensing system according to claim 1, further comprising a bearing disposed between the first insertion hole and the hopper, wherein the bearing is configured to reduce friction.

13. The dispensing system according to claim 12, wherein the bearing is disposed between the second insertion hole of the main base and the hopper hub.

14. The dispensing system according to claim 1, the dispensing device further comprising a transfer block disposed on the lower base, wherein the transfer block is configured to transfer a motion of an actuator to the hopper.

15. The dispensing system of claim 1, wherein the dispensing system further comprises a dispensing station and a fixing plate configured to fix the dispenser apparatus to the dispensing station, and wherein the dispensing station comprises:
a stationary base fixed at the center of rotation of the apparatus;
an upper base housing a plurality actuators of the dispensing station;
a platform that distances the upper base from the stationary base; and
a drive wheel disposed on the upper base to rotate the hopper or a hopper hub, wherein
a first actuator in the plurality of actuators is disposed between the upper portion of the platform and a bottom portion of the upper base, orienting the dispenser to a target dispensing location;
a second actuator in the plurality of actuators is disposed between the upper base and the drive wheel, wherein the second actuator is configured to slide and engage the drive wheel with the hopper;
a third actuator in the plurality of actuators is disposed on the upper base to rotate the drive wheel; and
a fourth actuator in the plurality of actuators is disposed on the upper base, wherein the fourth actuator is configured to engage the gate in a sliding, or activating, motion.

16. The dispensing system according to claim 15, wherein the drive wheel further comprises a drive belt.

17. The dispensing system according to claim 15, wherein the dispensing station further includes a controller to electronically communicate with the dispenser.

18. The dispensing system according to claim 15, wherein the dispensing system further comprises a dial comprising:
a plurality of dispensers fixed about an outer circumference; and
a fifth actuator in the plurality of actuators that orients one of the plurality of dispensers to the dispensing station.

19. The dial according to claim 18, wherein the dial comprises a gantry or robotic arm.

20. The dispensing system according to claim 15, wherein the fixing plate includes a fourth insertion hole with an aperture greater than the size of the upper base, distanced from the main base by a plurality of spring-dampers that isolate the fixing plate from vibration produced by the vibration device, and wherein a first end of the fixing plate is fixed to the dial.

21. The dispensing system according to claim 18, wherein the dispensing system further comprises a central controller configured to control an intensity and an activation period of the vibration device, an orientation of the dial, and a state of each actuator in the plurality of actuators.

22. The dispensing system according to claim 15, wherein the fixing plate includes a plurality of notches disposed on the first end thereof, formed in a unique pattern that uniquely distinguish the first fixing plate from another fixing plate.

23. The dispensing system according to claim 1, wherein the dispensing system further comprises a containment system and a support structure configured to contain a dispensed material and determine the weight of a dispensed material from the dispenser apparatus, the containment system comprising:
   a primary base formed with a plurality of holes allowing a plurality of prongs of the support structure to penetrate through;
   a bin disposed on a top surface of the primary base, configured to accommodate a screen, wherein the screen is configured to filter material;
   a first fan configured to draw air through the screen;
   a printing plate disposed above the bin, formed in a 'T'-shape, and configured to be a target dispensing location; and
   a docking station configured to accommodate the end cap.

24. The dispensing system according to claim 23, wherein the printing plate is formed in an 'I'-shape or plate shape.

25. The dispensing system according to claim 23, further comprising a plurality of fans configured to draw air through the screen, wherein the first fan is in the plurality of fans.

26. The dispensing system according to claim 23, wherein the support structure comprises:
   a balance to determine the mass of dispensed material; and wherein
   the plurality of prongs penetrates the plurality of holes of the primary base and are configured to support the printing plate.

27. The dispensing system according to claim 26, wherein the balance continuously determines the mass of dispensed material.

* * * * *

UNITED STATES PATENT AND TRADEMARK OFFICE
CERTIFICATE OF CORRECTION

PATENT NO. : 9,845,167 B1
APPLICATION NO. : 15/625916
DATED : December 19, 2017
INVENTOR(S) : Federico Parietti et al.

It is certified that error appears in the above-identified patent and that said Letters Patent is hereby corrected as shown below:

On the Title Page

In (72) the Inventors:
After "Jeffrey Ackerman," delete "Cuhran" and insert --Curhan--.

Signed and Sealed this
Sixth Day of February, 2018

Joseph Matal
*Performing the Functions and Duties of the
Under Secretary of Commerce for Intellectual Property and
Director of the United States Patent and Trademark Office*